United States Patent
Ota et al.

(10) Patent No.: US 6,481,554 B1
(45) Date of Patent: *Nov. 19, 2002

(54) CLUTCH CONNECTION CONTROL SYSTEM

(75) Inventors: Atsuo Ota; Toshiya Nagatsuyu, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/714,460

(22) Filed: Nov. 17, 2000

(30) Foreign Application Priority Data

Nov. 19, 1999 (JP) ............................................ 11-329721

(51) Int. Cl.[7] .............................................. B60K 41/22
(52) U.S. Cl. .................................................. 192/103 R
(58) Field of Search ............................. 192/3.56, 3.63, 192/103 R, 103 F, 90, 109 F, 84.6; 477/86, 175, 179, 87, 176

(56) References Cited

U.S. PATENT DOCUMENTS

| | | | |
|---|---|---|---|
| 4,172,505 A | * 10/1979 | Rabus et al. | 180/178 |
| 4,244,244 A | * 1/1981 | Rembold et al. | 192/103 R |
| 4,529,072 A | * 7/1985 | Oguma et al. | 192/3.58 |
| 4,646,891 A | * 3/1987 | Braun | 192/111 A |
| 4,860,863 A | * 8/1989 | Hayashi | 477/176 |
| 4,971,183 A | * 11/1990 | Tellert | 192/103 R |
| 5,275,267 A | * 1/1994 | Slicker | 192/103 R |
| 5,332,074 A | * 7/1994 | Braun | 192/3.58 |
| 5,421,440 A | * 6/1995 | Kumagai | 192/103 R |

FOREIGN PATENT DOCUMENTS

| | | |
|---|---|---|
| JP | 1-122741 | 5/1989 |
| JP | 3-134324 A | * 6/1991 |
| JP | 11-82709 | 3/1999 |

* cited by examiner

*Primary Examiner*—Rodney H. Bonck
(74) *Attorney, Agent, or Firm*—Birch, Stewart, Kolasch & Birch, LLP

(57) ABSTRACT

To provide a clutch connection control system capable of shortening the time required for clutch connection, preventing the degradation of riding comfort upon clutch connection, and ensuring good operability. A separation distance, that is, a shift amount of a clutch driven side from a clutch drive side is controlled by a clutch release mechanism driven by a drive motor. A drive side turning speed detecting portion detects a turning speed Nin of the drive side. A driven side turning speed detecting portion detects a turning speed Nout of the driven side. A turning speed difference detecting portion detects a difference Nd between the detected drive side turning speed Nin and driven side turning speed Nout. A rate-of-change detecting portion detects a time-dependent rate of change ΔNd of the detected turning speed difference Nd. A control portion performs clutch connection at a first speed until the time-dependent rate of change ΔNd becomes a specific value or less and performs clutch connection at a second speed lower than the first speed after the time-dependent rate of change ΔNd becomes the specific value or less.

13 Claims, 21 Drawing Sheets

(PRESENT INVENTION)

CLUTCH CONNECTION CONTROL SYSTEM

BACKGROUND OF THE INVENTION

1. Field of the Invention

The present invention relates to a clutch connection control system for a motor-driven speed change apparatus in which gear shift and disconnection and connection of a clutch are performed by using an electric motor. In particular, the present invention relates to a clutch connection control system for variably controlling a connection speed of the clutch on the basis of turning speeds of a clutch drive side and a clutch driven side.

2. Description of Related Art

As opposed to a related speed change apparatus for carrying out gear shift by operating both a clutch pedal (or clutch lever) and a gear shift lever, a motor-driven speed change apparatus for electrically carrying out gear shift by using a motor has been known, for example, from Japanese Patent Laid-open No. Hei 1-122741.

To shorten the time required for clutch connection and improve riding comfort upon clutch connection, the above related art speed change apparatus is configured such that an operational speed of a clutch release mechanism, that is, a turning speed of a drive motor is controlled in such a manner that a turning speed difference between a clutch drive side and a clutch driven side follows a predetermined time function.

An earlier application (Japanese Patent Laid-open No. Hei 11-82709) filed by the present applicant has disclosed a technique in which a clutch release mechanism upon clutch connection is operated at a high speed until a predetermined timing estimated as a clutch connection point and is operated at a low speed after the predetermined timing.

With this configuration, since the clutch is moved at a high speed in an operational region in which a clutch drive side is not in contact with a clutch driven side and is moved at a low speed in an operational region in which the clutch drive side is connected to the clutch driven side, it is possible to shorten the time required for speed change and to improve riding comfort upon speed change.

According to the above-described first related art (Japanese Patent Laid-open No. Hei 1-122741), a turning speed difference between the clutch drive side and the clutch driven side is controlled to be reduced with an elapsed time as shown in FIG. 33 of the present invention. To be more specific, as the speed change control starts by turning the drive motor, the clutch drive side and the clutch driven side, the turning speeds of which are different from each other, begin to come into contact with each other (which is called a semi-clutch state). Since the semi-clutch state proceeds with an elapsed time, the turning speed difference also becomes gradually smaller, and when the clutch drive side and the clutch driven side are perfectly brought into contact with each other, the turning speed difference becomes zero, to thus end the speed change control.

The control method of the first related art, however, has a problem in that if the turning speed difference becomes larger again by the driver's operation of an accelerator after start of the speed change control, for example, at a time $t_o$ in FIG. 33, the clutch drive side is rapidly connected to the clutch driven side in order that the turning speed difference is immediately made to follow the time function as shown by a broken line in FIG. 33, with a result that riding comfort upon speed change is degraded.

The above-described second related art (Japanese Patent Laid-open No. Hei 11-82709) also has the following problem: namely, according to this technique, the operation for clutch connection is performed at a low speed after the predetermined timing estimated as the clutch connection point; however, if the connection point is predetermined in consideration of differences among respective clutch mechanisms and deterioration of each clutch mechanism with an elapsed time, it cannot be close to an actual clutch connection point. Therefore, the operational speed must be changed into the above low speed at such a predetermined point which is considerably far from the actual clutch connection point. Accordingly, a time consumed for driving the clutch at the low speed becomes longer. That is to say, it is difficult to significantly shorten the time required for clutch connection.

An object of the present invention is to solve the above-described technical problems of the related arts and to provide a clutch connection control system capable of shortening the time required for clutch connection, preventing the degradation of riding comfort upon clutch connection, and ensuring a good operability.

SUMMARY OF THE INVENTION

To achieve the above object, according to the present invention, there is provided a clutch connection control system comprising: clutch release means for disconnecting and connecting a clutch drive side from and to a clutch driven side by turning an electric motor; drive side turning speed detecting means for detecting a turning speed of the clutch drive side; driven side turning speed detecting means for detecting a turning speed of the clutch driven side; turning speed difference detecting means for detecting a difference between the detected turning speed of the clutch drive side and the detected turning speed of the clutch driven side; and control means for controlling a disconnecting and connecting speed of the clutch, which is disconnected and connected by the clutch release means, on the basis of the detected turning speed difference; wherein the control system further includes rate-of-change detecting means for detecting a time-dependent rate of change of the detected turning speed difference; and the control means carries out clutch connection at a first speed until the time-dependent rate of change of the detected turning speed difference becomes a specific value or less, and the control means carries out clutch connection at a second speed lower than the first speed after the time-dependent rate of change of the detected turning speed difference becomes the specific value or less.

The time-dependent rate of change of a difference between the turning speeds of the clutch drive side and the clutch driven side represents a clutch connection state. Accordingly, a clutch connection start point can be accurately determined, on the basis of the time-dependent rate of change of the turning speed difference, irrespective of differences between respective clutch mechanisms and deterioration of each clutch mechanism with an elapsed time. Upon the connection of the clutches, with the configuration of the present invention, since the clutch drive side and the clutch driven side come close to each other at a high speed until the clutch connection start point determined as described above and come close to each other (come into contact with each other) at a low speed after the clutch connection start point, it is possible to shorten the time required for clutch connection, prevent the degradation of riding comfort, and ensure good operability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
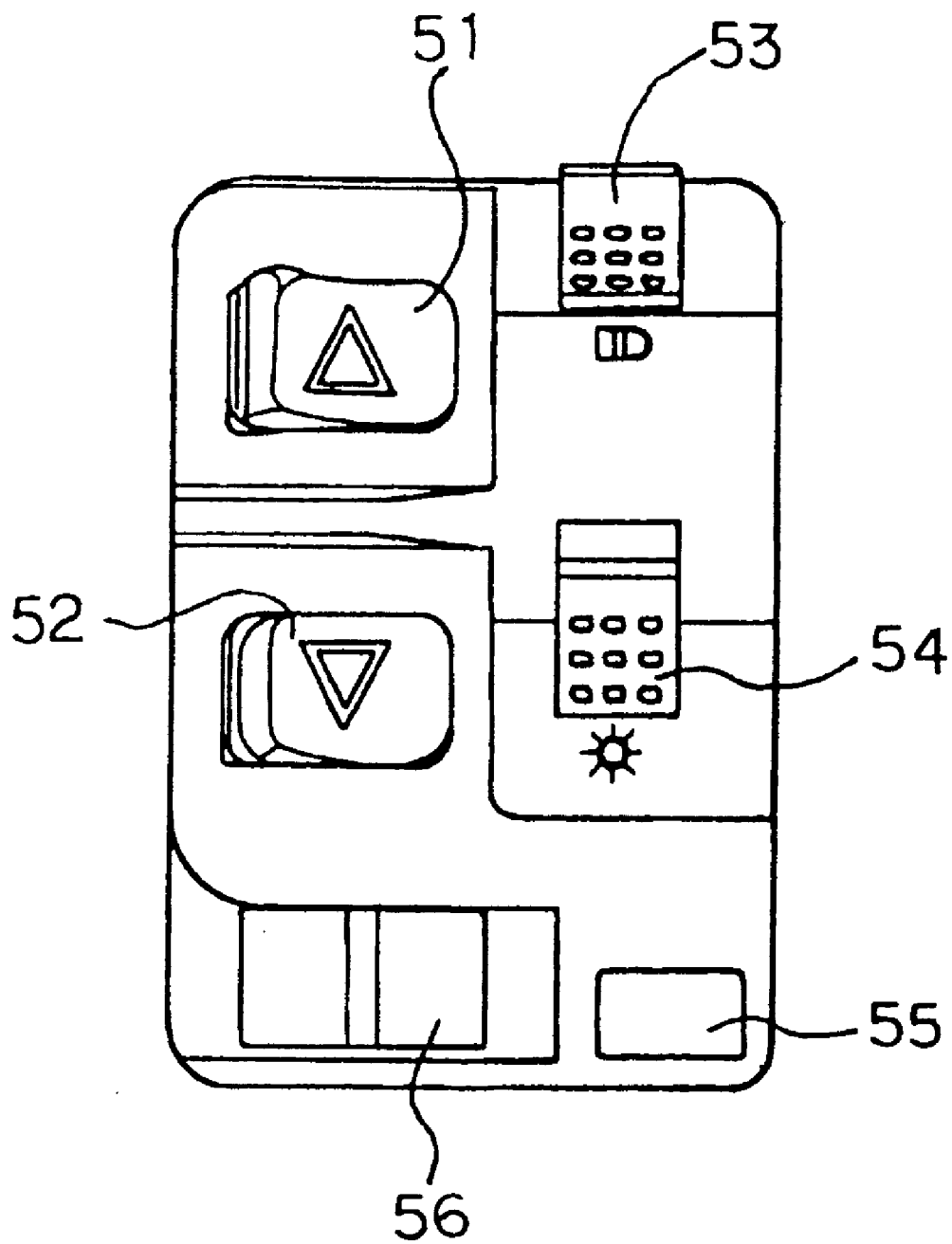
FIG. 1 is a plan view of an operational portion of a vehicle on which a motor-driven speed change apparatus of the present invention is mounted.

Hereinafter, an embodiment of the present invention will be described in detail with reference to the drawings. FIG. 1 is a plan view of an operational portion of a vehicle including a motor-driven speed change apparatus including a clutch connection control system of the present invention.

The operational portion includes a shift-up switch 51 and a shift-down switch 52 for carrying out motor-driven gear shift; a dimmer switch 53 for switching the direction of a headlamp upward or downward; a lighting switch 54 for switching a lighting state of the headlamp between the lighting-up and lighting-out states; and an engine start switch 55 and an engine stop switch 56. In this embodiment, the shift position is shifted up or shifted down by one step each time the shift-up switch 51 or shift-down switch 52 is depressed.

Figure 2:
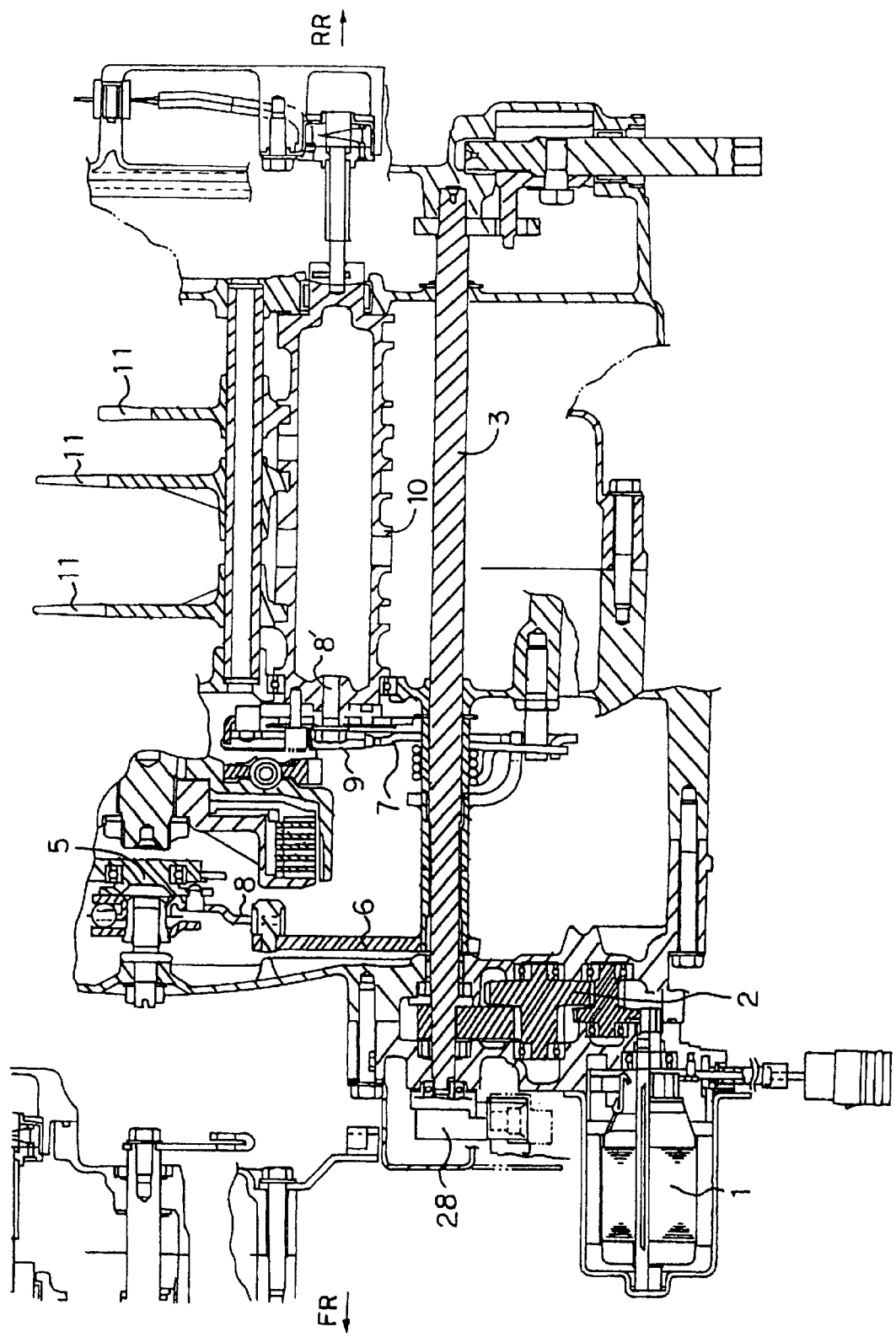
FIG. 2 is a partial sectional view showing a configuration of a principal portion of a drive system of the motor-driven speed change apparatus according to one embodiment of the present invention.

FIG. 2 is a partial sectional view showing the configuration of a principal portion of a drive system of the motor-driven speed change apparatus to which the present invention is applied.

A shift spindle 3 is normally or reversely turned via a speed reduction gear mechanism 2 by a drive motor 1 as an electric actuator. A turning position or turning angle of the shift spindle 3 is detected by an angle sensor 28 provided at one end of the shift spindle 3. A conversion mechanism 8 for converting a turning motion of the shift spindle 3 into a straight-ahead movement is provided at one end of a clutch arm 6 extending upright from the shift spindle 3. In a stage in which the shift spindle 3 is turned from a neutral position by the drive motor 1, the connection of a speed change clutch 5 is released irrespective of the turning direction of the shift spindle 3. In a stage in which the shift spindle 3 is reversely turned up to the neutral position by the drive motor 1, the disconnection state of the speed change clutch 5 is returned again into the connection state. The clutch arm 6 and the conversion mechanism 8 are configured such that the connection of the speed change clutch 5 is released when the shift spindle 3 is turned up to a specific angle (for example, ±6°).

One end of a master arm 7 fixed to the shift spindle 3 is engaged with a clutch mechanism 9 provided on a shift drum shaft 8'. Accordingly, when the shift spindle 3 is turned by the drive motor 1, the shift drum 10 is turned in the direction corresponding to the turning direction of the shift spindle 3. When the shift spindle 3 is turned in the normal or reverse rotation direction from a neutral position, the master arm 7 and the clutch mechanism 9 are engaged with the shift spindle 3, to thus turn the shift drum 10.

When the shift spindle 3 is turned in the direction where it is returned to the neutral position, the engagement state between the master arm 7 and clutch mechanism 9 and the shift spindle 3 is released with the shift drum 10 remaining at the above-described turned position.

The tip of each a plurality of shift forks 11 is engaged in an outer peripheral groove 31 of corresponding sleeves 30 which will be described in detail later with reference to FIG. 4. When the shift forks 11 are axially translated by the turning motion of the shift drum 10, any one of the sleeves is translated on a main shaft (not shown) in accordance with the turning direction and turning angle of the shift drum 10.

Figure 4:
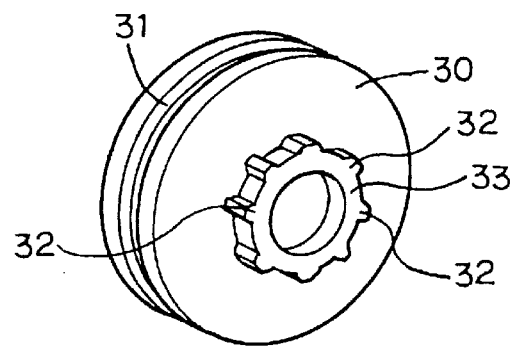
FIG. 4 is a perspective view of the sleeve shown in FIG. 3.

FIG. 4 is a perspective view of the sleeve designated by reference numeral 30.

The sleeve 30 is inserted on the main shaft (not shown) in such a manner as to be axially slidably movable on the main shaft. A groove 31, in which the tip of the shift fork 11 is to be engaged, is formed in an outer peripheral side surface of the sleeve 30 in such a manner as to extend in the circumferential direction. A plurality of projecting side dowels 32 to be engaged with recess side dowels 42 of a gear 40 (which will be described with reference to FIG. 5) are integrally formed, together with an annular flange 33, on an outer peripheral portion of an axial hole of the sleeve 30.

Figure 3:
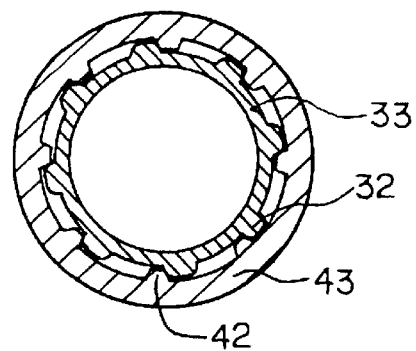
FIG. 3 is a conceptual view showing a state in which a sleeve according to the present invention is engaged with a gear according to the present invention.
Figure 5:
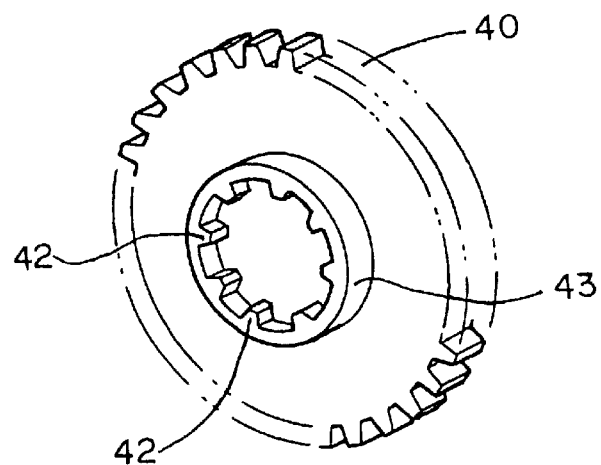
FIG. 5 is a perspective view of the gear shown in FIG. 3.

FIG. 5 is a perspective view of the gear 40 which is rotatably supported on the main shaft (not shown) at a specific position. A plurality of the recess side dowels 42 to be engaged with the projection side dowels 32 of the sleeve 30 are integrally formed, together with an annular flange 43, on an outer peripheral portion of an axial hole of the gear 40. FIG. 3 is a conceptual view showing a state in which the sleeve 30 is engaged with the gear 40 via the dowels 32 and 42.

Figure 9:
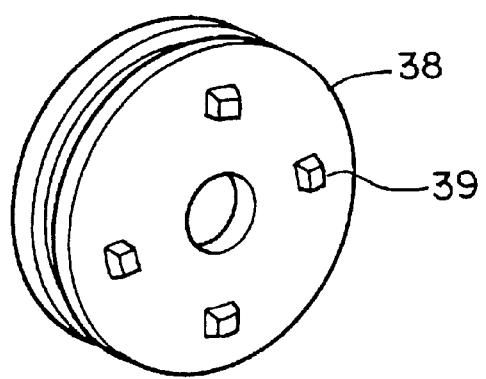
FIG. 9 is a perspective view of a sleeve of the related art;.
Figure 10:
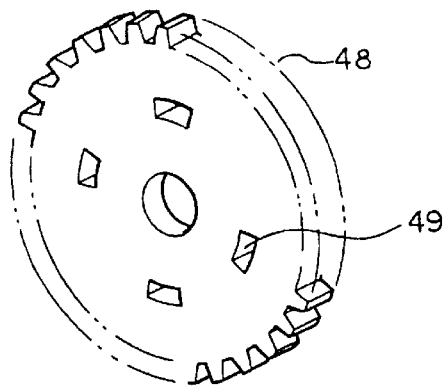
FIG. 10 is a perspective view of a gear of the related art.

FIGS. 9 and 10 are perspective views of a sleeve 38 and a gear 48 according to the related art, respectively. A plurality of projection side dowels 39 are independently provided on a side surface of the sleeve 38 in such a manner as to be disposed coaxially with an axial hole of the gear 48. In this configuration, however, to independently dispose the projection side dowels 39 on the side surface of the sleeve 38, the bottom area of each dowel 39 must be made relatively large for ensuring sufficient strength thereof. As a result, according to the related art, a ratio of a width of the projection side dowel 39 in the turning direction to a width of a dowel hole 49 of the gear 40 in the turning direction increases. Therefore, as shown in FIG. 9, about four projection side dowels 39 are provided on the side surface of the sleeve 38.

Figure 12:
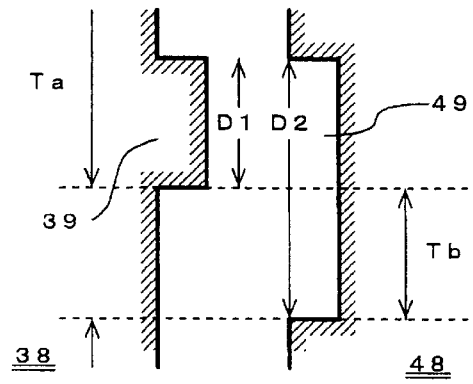
FIG. 12 is a schematic diagram showing an engagement timing between the sleeve and the gear of the related art.

FIG. 12 is a schematic diagram showing a relative positional relationship between the projection side dowel 39 of the sleeve 38 and the dowel hole 49 of the gear 48 according to the related art. As shown in this figure, a width D2 of the dowel hole 49 in the turning direction is as large as about twice a width D1 of the projection side dowel 39. Accordingly, a period Ta in which the projection side dowel 39 cannot be engaged or inserted in the dowel hole 49 becomes longer than a period Tb in which the projection side dowel 39 can be engaged or inserted in the dowel hole 49.

Figure 13:
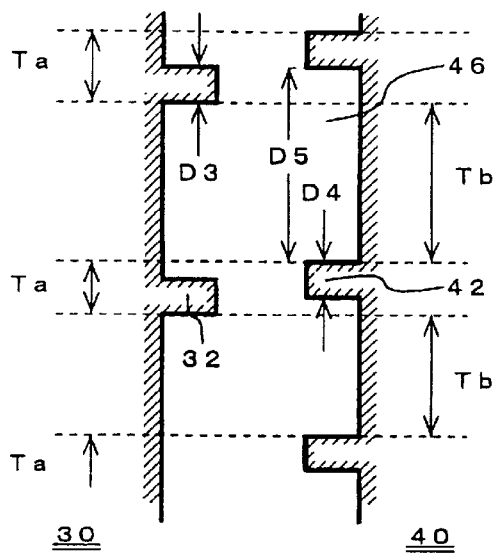
FIG. 13 is a schematic diagram showing an engagement timing between the sleeve and the gear according to the present invention.

On the contrary, according to the embodiment of the present invention illustrated in FIG. 13, since the projection side dowels 32 are integrally formed on the annular flange 33, it is possible to shorten a width D3 of the projection side dowel 32 in the turning direction while ensuring sufficient strength of the dowel 32 and correspondingly shorten a width D4 of the recess side dowel 42 of the gear 40. As a result, it is possible to make a period Ta, in which the projection side dowel 32 cannot be inserted in a dowel hole 46 between the recess side dowels 42, shorter than a period Tb, in which the projection side dowel 32 can be inserted in the dowel hole 46, and hence improve the probability of dowel insertion.

According to the present invention, a difference between the width D5 of the dowel hole 46 in the turning direction and the width D3 of the projection side dowel 32 can be made smaller than a difference between the width D2 of the dowel hole 49 in the turning direction and the width D1 of the projection side dowel 39 according to the related art. Accordingly, it is possible to decrease the play between the dowel hole 46 and the projection side dowel 32 engaged in the dowel hole 46, and hence to reduce noise caused by speed change operation.

Figure 6:
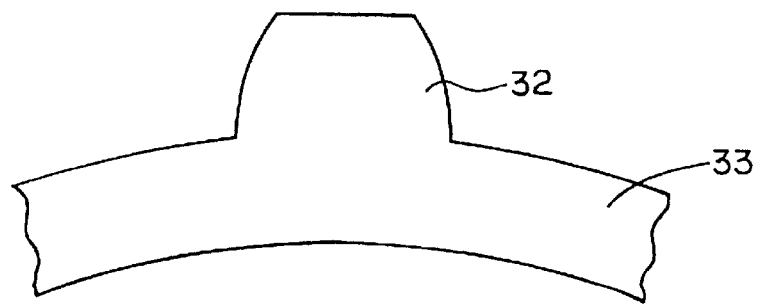
FIG. 6 is a partial enlarged view of a projection side dowel 32 of the sleeve shown in FIG. 4.
Figure 7:
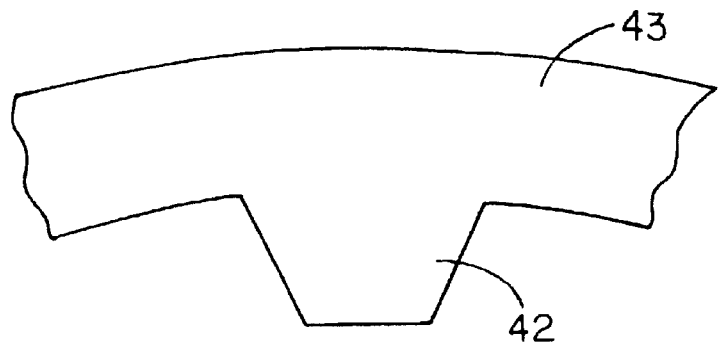
FIG. 7 is a partial enlarged view of a recess side dowel 42 of the gear shown in FIG. 5.
Figure 8:
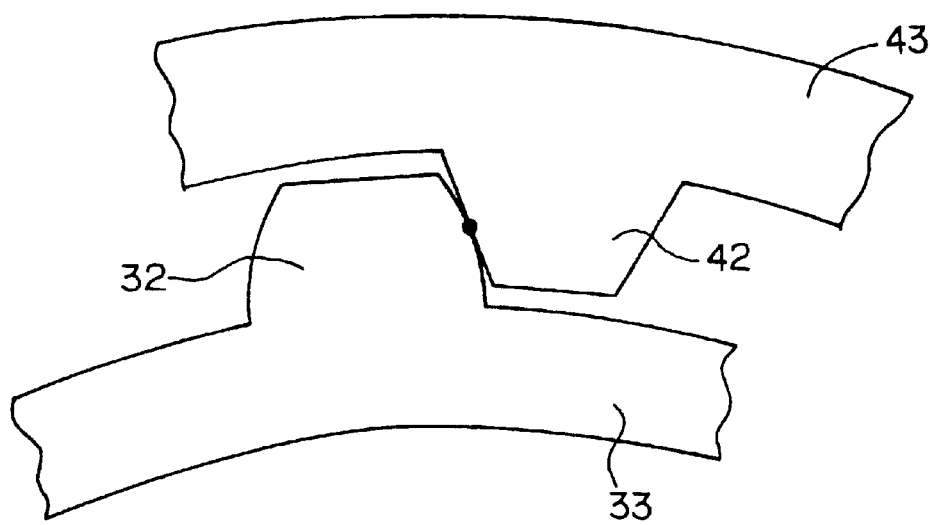
FIG. 8 is a view showing a state in which the projection side dowel 32 is engaged with the recess side dowel 42.

According to the present invention, the taper of the projection side dowel is formed into an outwardly curved shape as shown in FIG. 6, and the taper of the recess side dowel 42 is formed into a straight-line shape as shown in FIG. 7. As a result, the projection side dowel 32 can be brought into line-contact with the recess side dowel 42 along the axial direction. This makes it possible to prevent the occurrence of stress concentration, and hence to substantially improve the strength of the dowels and enhance the durability and wear resistance of the dowels.

With this configuration, when the sleeve 30 is translated to a predetermined position by the shift fork 11 and the projection side dowels 32 of the sleeve 30 are inserted in the dowel holes 46 of the gear 40, as is well known, the gear which has been supported by the main shaft in an idle state is engaged with the main shaft via the sleeve 30, to be turned in synchronization with the main shaft. In this way, a rotational force transmitted from a clutch shaft to a counter shaft (both are not shown) is transmitted to the main shaft via the gear 40.

While not shown, the engine of the vehicle of the present invention is a four-cycle engine in which the power of the engine is transmitted to a power transmission system, which is adapted to transmit power from a crank shaft to a main shaft, via a centrifugal clutch on a crank shaft and a clutch on the main shaft. Accordingly, if the engine speed is a specific value or less, the power transmission to the clutch on the main shaft is cutoff by the centrifugal clutch. That is to say, upon stoppage of the vehicle, the gear can be shifted to any speed.

Figure 14:
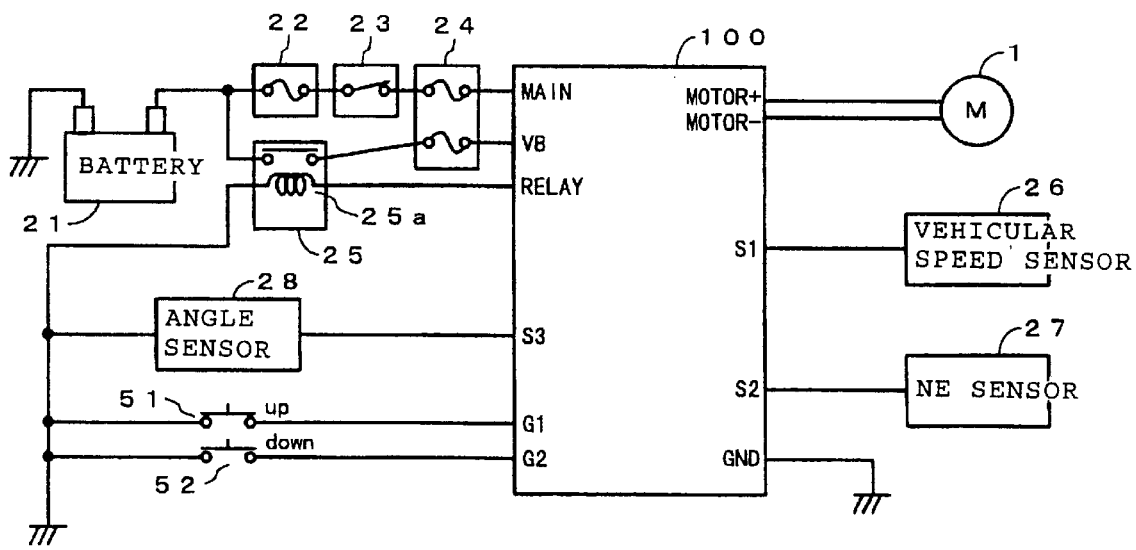
FIG. 14 is a block diagram showing a configuration of a principal portion of a control system of the motor-driven speed change apparatus according to the embodiment of the present invention.
Figure 15:
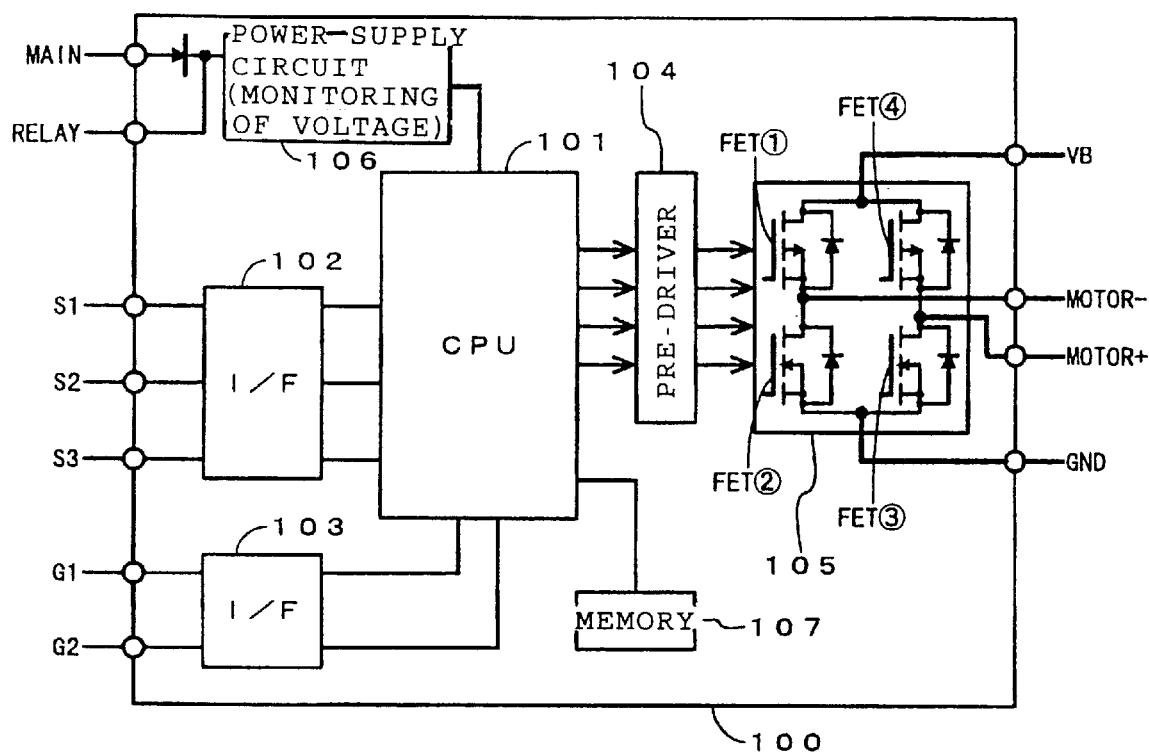
FIG. 15 is a block diagram showing a configuration example of an ECU100 show in FIG. 14.

FIG. 14 is a block diagram showing a configuration of a principal portion of a control system of the motor-driven speed change apparatus, and FIG. 15 is a block diagram showing a configuration example of an ECU100 shown in FIG. 14.

Referring to FIG. 14, the drive motor 1 is connected to a MOTOR (+) terminal and a MOTOR (−) terminal of the ECU100. A vehicular speed sensor 26 for detecting a vehicular speed, an Ne sensor 27 for detecting an engine speed, and the angle sensor 28 for detecting a turning angle of the shift spindle 3 are connected to sensor signal terminals S1, S2 and S3, respectively. The shift-up switch 51 and the shift-down switch 52 are connected to speed change command terminals G1 and G2, respectively.

A battery 21 is connected to a MAIN terminal of the ECU100 via a main fuse 22, a main switch 23, and a fuse box 24. The battery 21 is also connected to a VB terminal via a fuel safe (F/S) relay 25 and the fuse box 24. An excitation coil 25a of the fuel safe (F/S) relay 25 is connected to a RELAY terminal.

In the ECU100, as shown in FIG. 15, the MAIN terminal and RELAY terminal are connected to a power supply circuit 106, and the power supply circuit 106 is connected to a CPU101. The sensor signal terminals S1, S2, and S3 are connected to input terminals of the CPU101 via an interface circuit 102. The speed change command terminals G1 and G2 are connected to input terminals of the CPU101 via an interface circuit 103.

A switching circuit 105 includes an FET $\hat{1}$, an FET $\hat{2}$, an FET $\hat{3}$, and a FET $\hat{4}$.

The FETs $\hat{1}$ and $\hat{2}$ placed in series are connected in parallel to the FETs $\hat{3}$ and $\hat{4}$ placed in series, and one end of the parallel connection is connected to the VB terminal and the other end of the parallel connection is connected to a GND terminal. The connection point between the FETs $\hat{1}$ and $\hat{2}$ is connected to the MOTOR (−) terminal, and the connection point between the FETs $\hat{3}$ and $\hat{4}$ is connected to the MOTOR (+) terminal. Respective FETs $\hat{1}$ to $\hat{4}$ are selectively subjected to PWM control via a pre-driver 104 by the CPU101. The CPU 101 controls each of the FETs $\hat{1}$ to $\hat{4}$ on the basis of a control algorithm stored in a memory 107.

Figure 32:
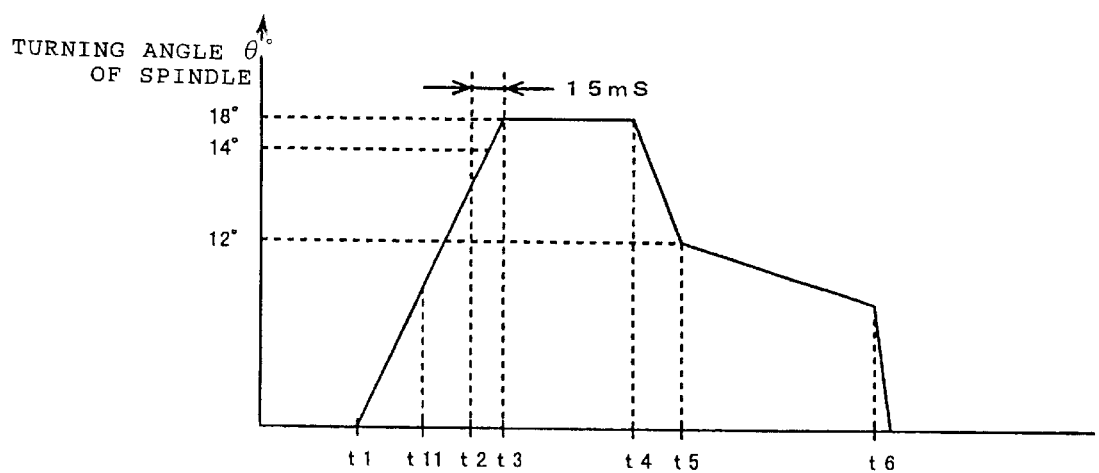
FIG. 32 is an operational timing chart of the shift spindle according to the present invention.
Figure 33:
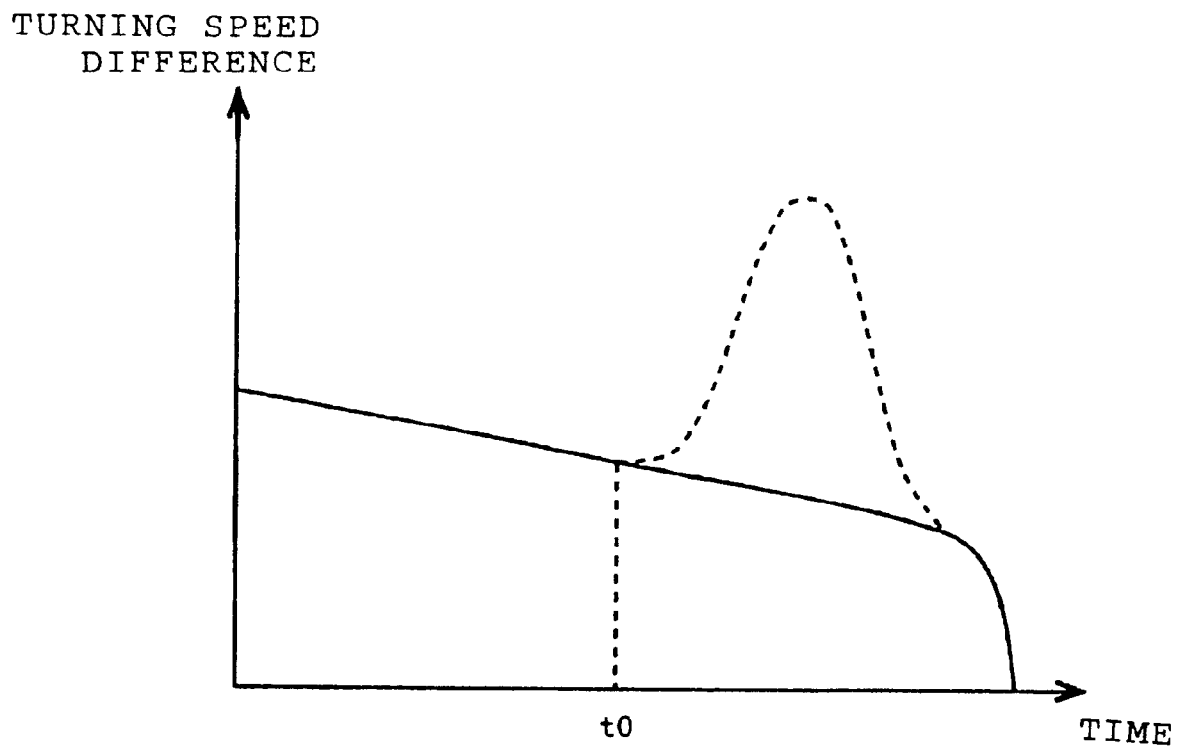
FIG. 33 is a graph showing control of a turning speed difference according to the related art.

A speed change method of the present invention will now be described below with reference to flowcharts illustrated in FIGS. 16 to 19 and an operational timing chart shown in FIG. 32.

It is decided at step S10 whether or not either of the shift-up switches is turned on. If YES, it is decided at step S11 which is turned on, the shift-up switch 51 or the shift-down switch 52. If it is decided that the shift-up switch 51 is turned on, the process goes on to step S13. If it is decided that the shift-down switch 52 is turned on, the process goes on to step S13 after the engine speed Ne is stored as a variable Ne1 at step S12.

At step S13, respective FETs of the switching circuit 105 in the ECU100 are selectively subjected to PWM control in accordance with the turned on shift-up switch 51 or shift-down switch 52. The PWM control starts from a time $t_1$ shown in FIG. 32. To be more specific, if the shift-up switch 51 has been turned on, the FETs $\hat{2}$ and $\hat{4}$ are subjected to PWM control at a 100% duty ratio with the FETs $\hat{1}$ and $\hat{3}$ left cutoff. As a result, the drive motor 1 begins to turn in the shift-up direction, and correspondingly the shift spindle 3 begins to turn in the shift-up direction.

If the shift-down switch 52 has been turned on, on the other hand, the FETs $\hat{1}$ and $\hat{3}$ are subjected to PWM control at a 100% duty ratio with the FETs $\hat{2}$ and $\hat{4}$ left cutoff. As a result, the drive motor 1 begins to turn in the shift-down direction reversed to the shift-up direction, and correspondingly the shift spindle 3 begins to turn in the shift-down direction.

Since the PWM control is performed at the 100% duty ratio, the gear shift speed can be increased and thereby the clutch connection can be quickly released. In this embodiment, the speed change apparatus is designed such that the clutch connection is released when the shift spindle is turned by an angle of 5° to 6°.

A first timer (not shown) starts time-counting at step S14, and a turning angle $\theta_O$ of the shift spindle 3 is detected by the angle sensor 28 at step S15. It is decided at step S16 whether or not the detected turning angle $\theta_O$ exceeds a first reference angle $\theta_{REF}$ which is ±14° in this embodiment. The expression "the detected turning angle $\theta_O$ exceeds ±14°" means that the detected turning angle $\theta_o$ becomes more than ±14° or less than −14°.

If it is decided that the turning angle $\theta_O$ exceeds ±14°, there is a strong possibility that the sleeve translated by the shift fork 11 reaches up to a normal dowel insertion position, and therefore, the process goes on to step S17. If it is decided that the turning angle $\theta_O$ does not exceed ±14°, there is a strong possibility that the sleeve does not reach up to the normal dowel insertion position, and therefore, the process goes on to step S30.

When the translational motion of the sleeve up to the normal dowel position is detected at a time $t_2$ on the basis of the turning angle $\theta_O$, the first timer is reset at step S17. At step S18, respective FETs of the switching circuit 105 are selectively subjected to PWM control in accordance with the turned shift-up switch 51 or shift-down switch 52 in order to brake the turning drive motor 1.

If the shift-up switch 51 has been turned on, the FETs $\hat{1}$ and $\hat{4}$ are subjected to PWM control at a 100% duty ratio with the FETs $\hat{2}$ and $\hat{3}$ left cutoff, and if the shift-down switch 52 has been turned on, the FETs $\hat{2}$ and $\hat{3}$ are subjected to PWM control at a 100% duty ratio with the FETs $\hat{1}$ and $\hat{4}$ left cutoff. As a result, the drive motor 1 is short-circuited, to function as a turning load, thereby braking the drive torque of the shift spindle 3 in the shift-up direction or shift-down direction. Accordingly, it is possible to ease the shock caused upon contact of the shift spindle 3 with a stopper. This is advantageous in terms of strength and noise. In addition, the turning angle of the shift spindle 3 upon contact with the stopper is set at 18°.

Figure 17:
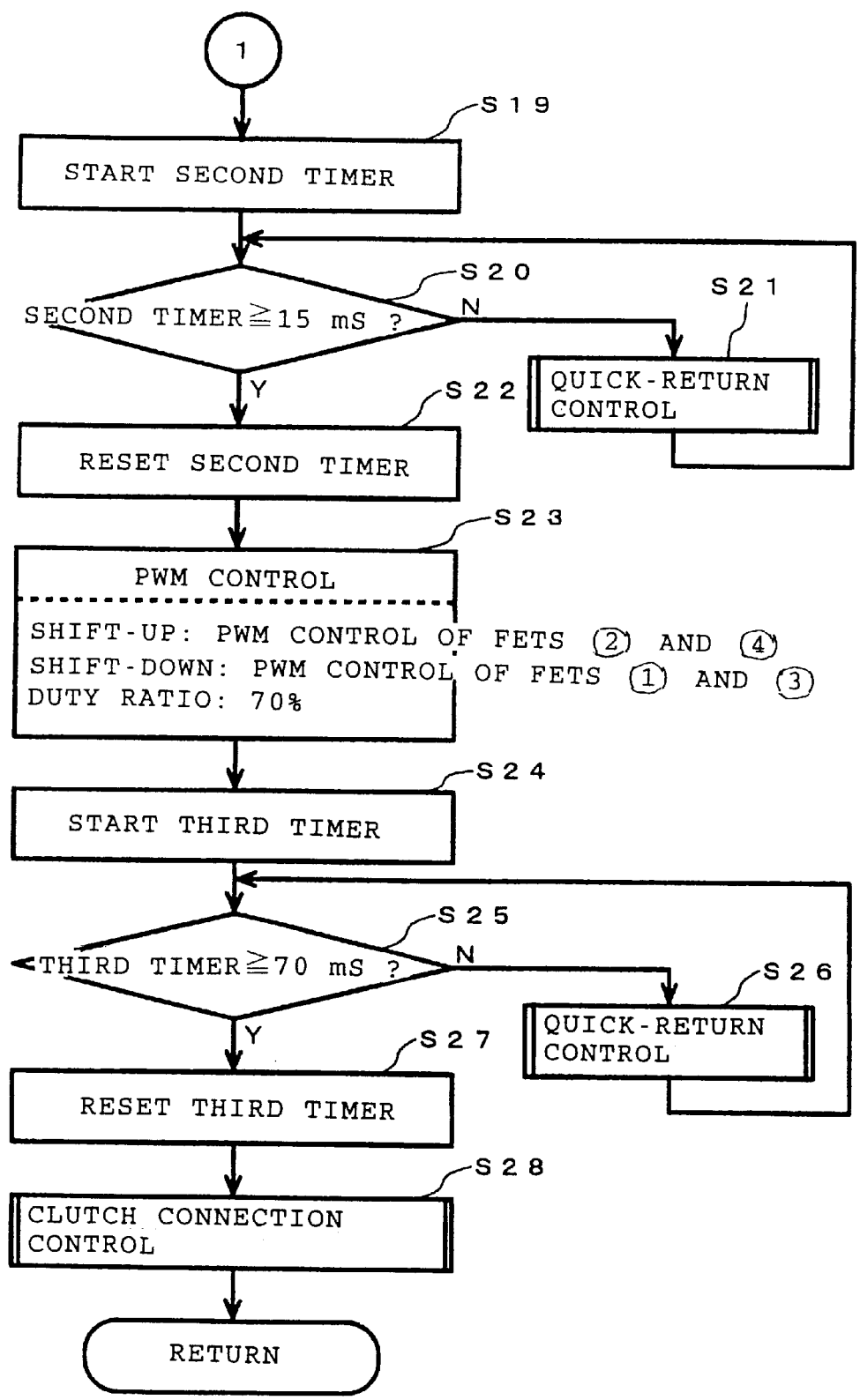
FIG. 17 is a flowchart (No. 2) illustrating a speed change method according to an embodiment of the present invention.

Referring to FIG. 17, a second timer for specifying a braking time starts time-counting at step S19, and it is decided at step S20 whether or not the period of time counted by the second timer exceeds 15 ms. If No, the process goes on to step S21 at which control of the engine speed (Ne) to be described in detail later is carried out. If the period of time counted by the second timer exceeds 15 ms at a time $t_3$ shown in FIG. 32, the process goes on to step S22 at which the second timer is reset.

At step S23, respective FETs of the switching circuit 105 are selectively subjected to PWM control in accordance with the turned shift-up switch 51 or shift-down switch 52. To be more specific, if the shift-up switch 51 has been turned on, the FETs $\hat{2}$ and $\hat{4}$ are subjected to PWM control at a 70% duty ratio with the FETs $\hat{1}$ and $\hat{3}$ left cutoff, and if the shift-down switch 52 has been turned on, the FETs $\hat{1}$ and $\hat{3}$ are subjected to PWM control at a 70% duty ratio with the FETs $\hat{2}$ and $\hat{4}$ left cutoff. As a result, since the sleeve is pressed to the gear side with a relatively weak torque, it is possible to reduce a load applied to respective dowels until dowel insertion and to certainly hold the dowel insertion state.

A third timer starts time-counting at step S24, and it is decided at step S25 whether or not the period of time counted by the third timer exceeds 70 ms. If NO, the process goes on to step S26 at which quick-return control is carried out, and if YES, the process goes on to step S27 at which the third timer is reset and clutch connection control to be described in detail later starts at a time $t_4$ shown in FIG. 32.

According to this embodiment, the timeout period (70 ms) of the third timer is determined on the period Ta, in which the dowel insertion is impossible, described with reference to FIG. 13. That is to say, the timeout period (70 ms) is set such that pressing control is carried out at least during the period Ta. Although the projection side dowel is in press-contact with the recess side dowel during the period Ta, a load applied to each of the dowels is low because the duty ratio is reduced to 70%. This is advantageous in terms of the strength of the dowels.

The timeout period of the third time is not necessarily fixed at a specific value, but may be variably set as the function of the gear, for example, may be set at 70 ms in a gear shift range of the first, second, and third speeds and set at 90 ms in a gear shift range of the fourth and fifth speeds.

Figure 16:
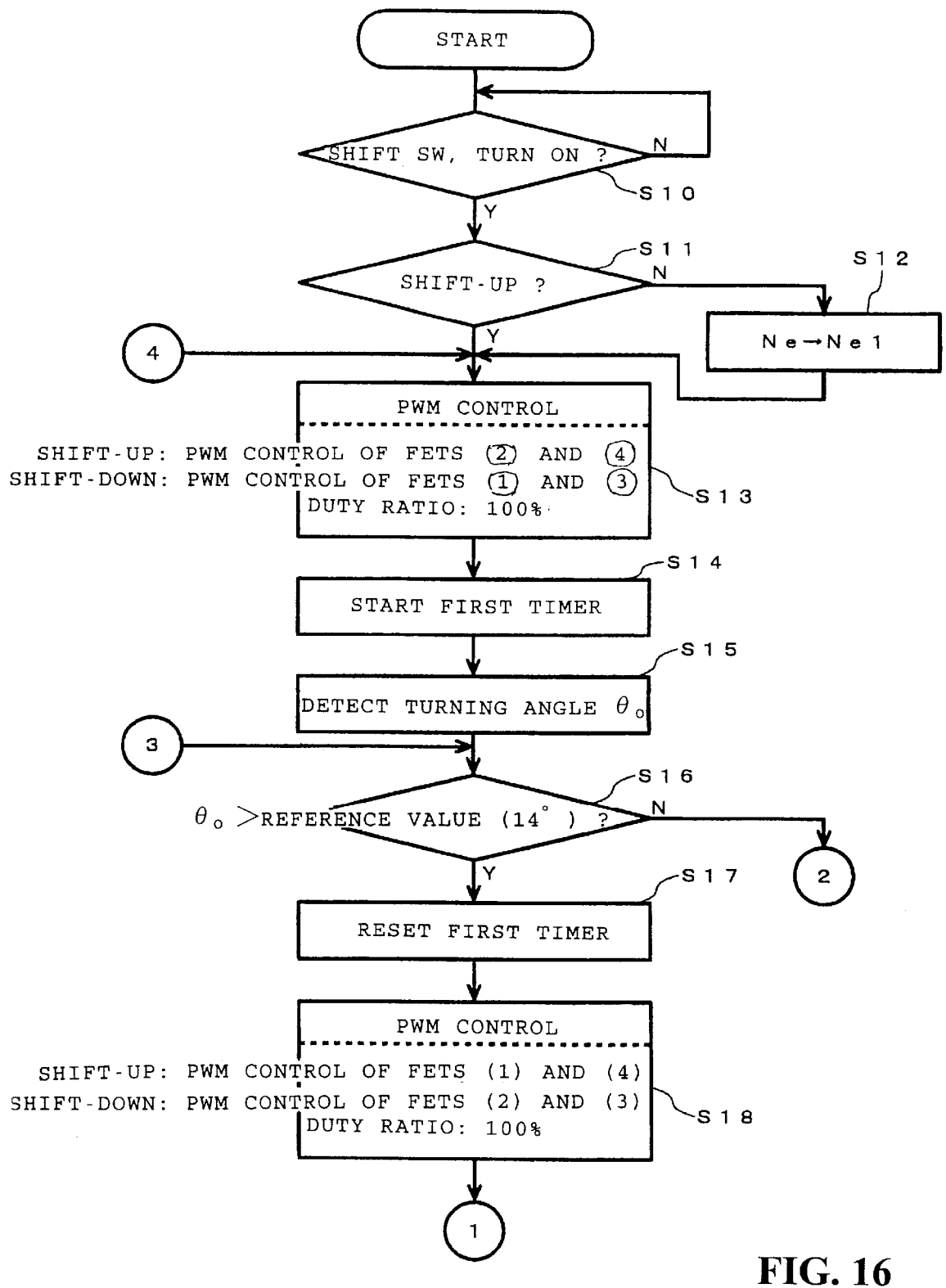
FIG. 16 is a flowchart (No. 1) illustrating a speed change method according to an embodiment of the present invention.
Figure 18:
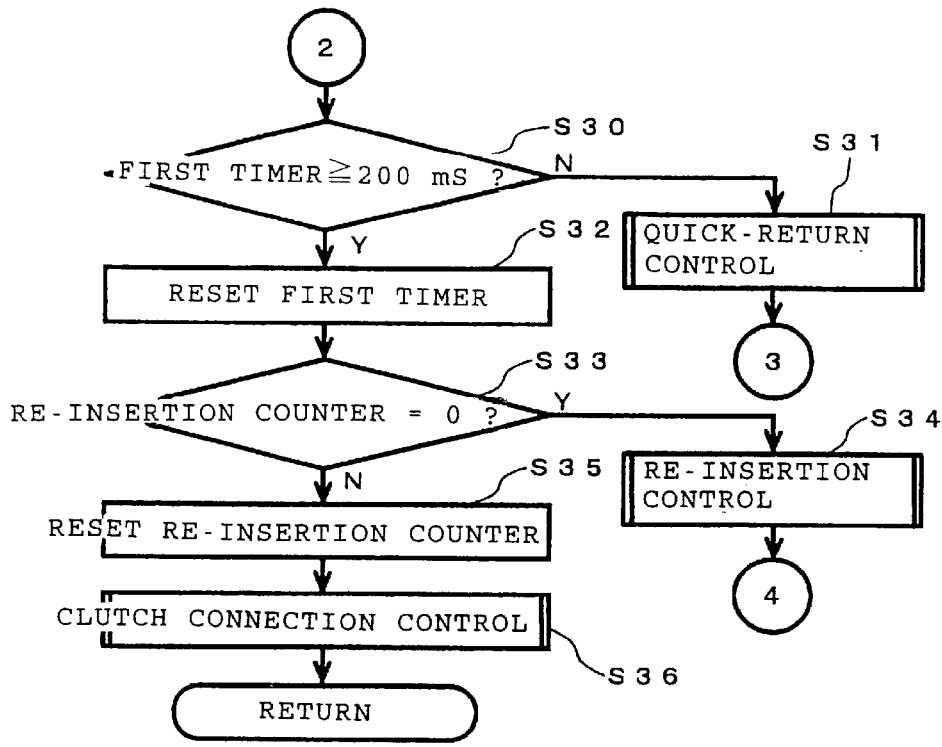
FIG. 18 is a flowchart (No. 3) illustrating a speed change method according to an embodiment of the present invention.

On the other hand, if it is decided at the above-described step S16 shown in FIG. 16 that the turning angle $\theta_O$ is less than the first reference angle $\theta_{REF}$, the process goes on to step S30 shown in FIG. 18. At step S30, it is decided whether or not the period of time counted by the first timer exceeds 200 ms. Since it is first decided that the period of time counter by the first timer does not exceed 200 ms, the process goes on to step S31 at which quick-return control is carried out, and is then returned to step S16 shown in FIG. 16.

When the period of time counted by the first timer exceeds 200 ms, which means that the present gear shift has failed, the first timer is reset at step S32. It is decided at step S33 whether or not a count value of a re-insertion counter is zero. If the count value of the re-insertion counter is zero (which means that the re-insertion counter is in the reset state), it is decided that the re-insertion control is not carried out, and the process goes on to step S34 at which the re-insertion control is carried out as will be described later. This is because, if the gear shift consumes a lot of time, the driver may sometimes feel a sense of incongruity.

If the count value of the re-insertion counter is 1 (which means that the re-insertion counter is in the set state), it is decided that the gear shift has failed although the re-insertion control has been carried out, and the process goes on to step S35 for clutch connection without carrying out gear shift. The re-insertion count is reset at step S35 and clutch connection control to be described in detail later is carried out at step S36.

Figure 19:
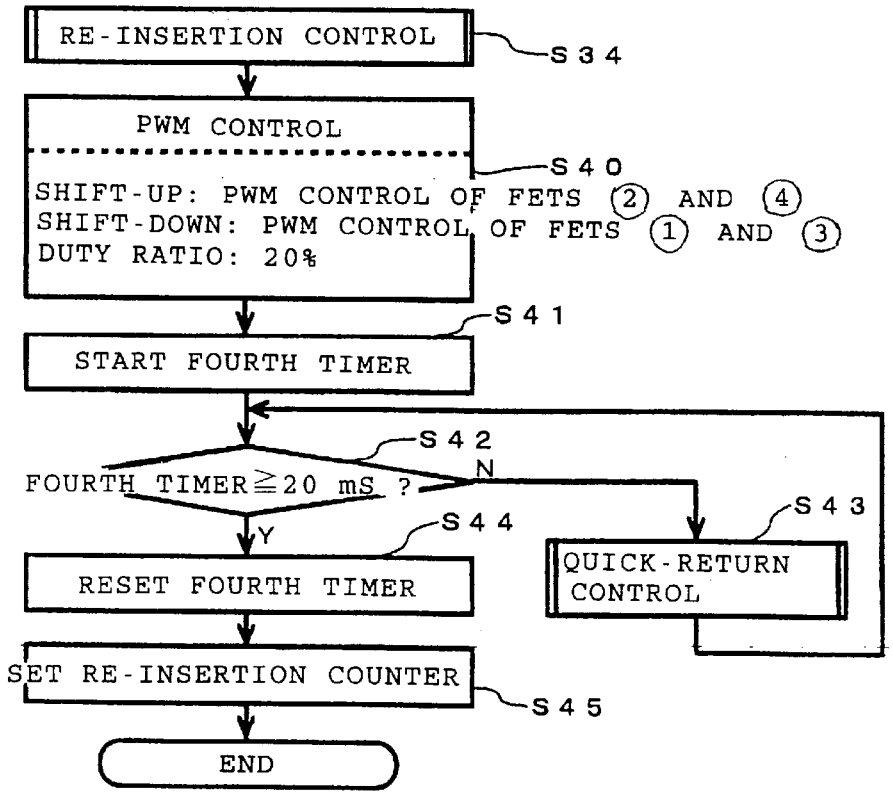
FIG. 19 is a flowchart (No. 4) illustrating a speed change method according to an embodiment of the present invention.

The re-insertion control will be described with reference to a flowchart shown in FIG. 19. The re-insertion control is a process that if the sleeve axially translated by the shift fork cannot be moved up to the normal fitting position, the movement torque is temporarily reduced and then a specific torque is given to try re-movement of the sleeve for re-insertion of the dowels of the sleeve.

At step S40, the duty ratios of the FETs under PWM control (the FETs $\hat{2}$ and $\hat{4}$ if the shift-up switch 51 is in the turn-on state, or the FETs $\hat{1}$ and $\hat{3}$ if the shift-down switch 52 is in the turn-on state) are each reduced to 20%. As a result, the drive torque applied to the sleeve by the shift fork 11 is weakened.

A fourth timer starts time-counting at step S41, and it is decided at step S42 whether or not the period of time counted by the fourth timer exceeds 20 ms. If the period of time does not exceed 20 ms, quick-return control is carried out at step S43, and if the period of time exceeds 20 ms, the fourth timer is reset at step S44 and the above-described re-insertion counter is set at step S45. Then, the process is returned to the above-described step S13 shown in FIG. 16 at which the drive motor 1 is again subjected to PWM control at a 100% duty ratio for applying the initial large torque to the sleeve.

According to this embodiment, if the gear shift is not normally performed, the pressing torque applied to the sleeve is temporarily weakened and then the strong torque is again applied to the sleeve, so that it is possible to easily carry out the re-insertion control of the sleeve.

Here, related to description of the operations for the above-described quick-return control and clutch connection control, the aim and basic concept of each control will be briefly described below.

The basic concept of the clutch connection control will be first described with reference to FIG. 32. In this embodiment, the turning of the shift spindle starts at the time $t_1$; the clutch connection is released at a $t_{11}$; the turning of the shift spindle is ended at the time $t_3$; and the pressing control is carried out in the period from the time $t_3$ to the time $t_4$, followed by the clutch connection control of the present invention.

To ensure good riding comfort upon clutch connection, it is required to perform clutch connection at a low speed by making the turning speed of the shift spindle 3 lower. On the contrary, to realize quick speed change, it is required to make the turning speed of the shift spindle higher because the gear shift speed is dependent on the turning speed of the shift spindle 3.

To simultaneously satisfy the above-described two requirements, the clutch connection control in this embodiment is carried out by turning the shift spindle 3 at a high speed in a period from the time $t_4$ to a time $t_5$ at which the semi-clutch state begins; turning, after the semi-clutch state begins at the time $t_5$, the shift spindle 3 at a low speed in a period from the time $t_5$ to a time $t_6$ at which the semi-clutch state is ended; and turning, after the semi-clutch state is ended at the time $t_6$, the shift spindle 3 at a high speed again. With this clutch connection control, it is possible to shorten the time required for speed change while ensuring good riding comfort upon clutch connection.

A method of determining the clutch connection start point (time $t_5$ in FIG. 32) in the above-described clutch connection control will be described below with reference to FIGS. 20 to 23.

The present invention is based on a new knowledge that a time-dependent rate of change of a difference between turning speeds of a clutch drive side and a clutch driven side upon speed change represents a clutch connection state, and is characterized in that the clutch connection start point, that is, the semi-clutch state start point is determined on the basis of the above-described time-dependent rate of change of the turning speed difference.

Figure 20:
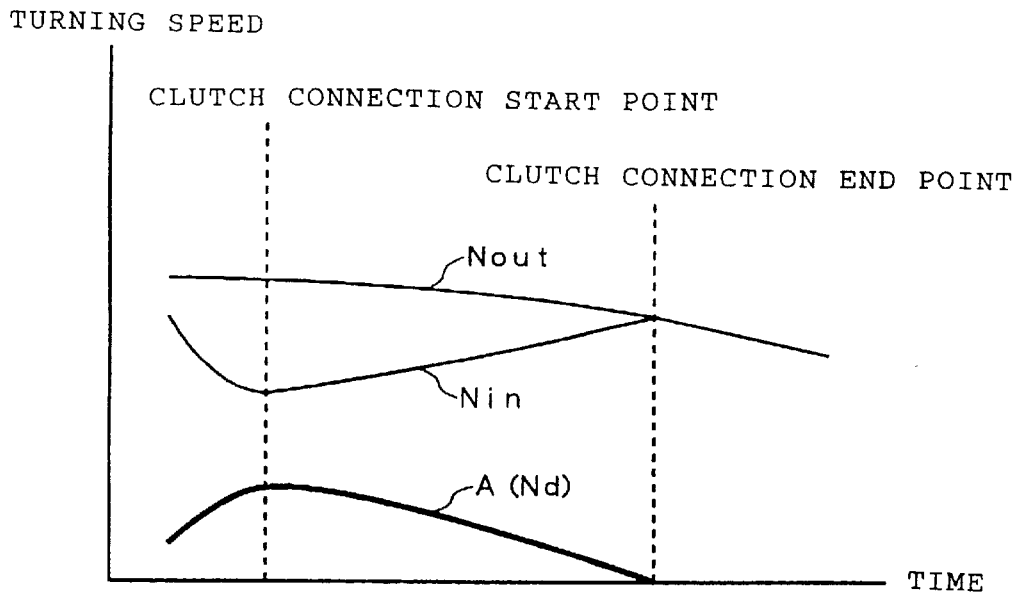
FIG. 20 is a graph showing a turning speed Nin of a clutch drive side, a turning speed Nout of a clutch driven side, and a turning speed difference Nd therebetween upon shift-up after return of an accelerator.

FIG. 20 is a graph showing a turning speed Nin of a clutch drive side, a turning speed Nout of a clutch driven side, and an absolute value A (Nd) of a turning speed difference Nd (=Nin−Nout) between the turning speeds Nin and Nout in a typical speed change mode in which shift-up is performed after the accelerator is returned.

In the case of performing shift-up after return of the accelerator, directly after the clutch connection is released, the turning speed Nin of the clutch drive side (engine side)

is reduced and the present turning speed Nout of the clutch driven side (wheel side) is almost kept as it is due to the inertia of the wheel side.

Then, as shown in FIG. 20, the automatic speed change process proceeds and a semi-clutch state occurs at a clutch connection start point. In this semi-clutch state, the turning speed Nin of the clutch drive side is increased because the clutch drive side is dragged by the clutch driven side, and the turning speed Nout of the clutch driven side is decreased because the clutch drive side becomes a turning load. The turning speed difference A (Nd) between both the turning speeds Nin and Nout disappears at a clutch connection end point. Accordingly, the turning speed difference A (Nd) is a function with the clutch connection start point taken as an inflection point (peak value).

Figure 21:
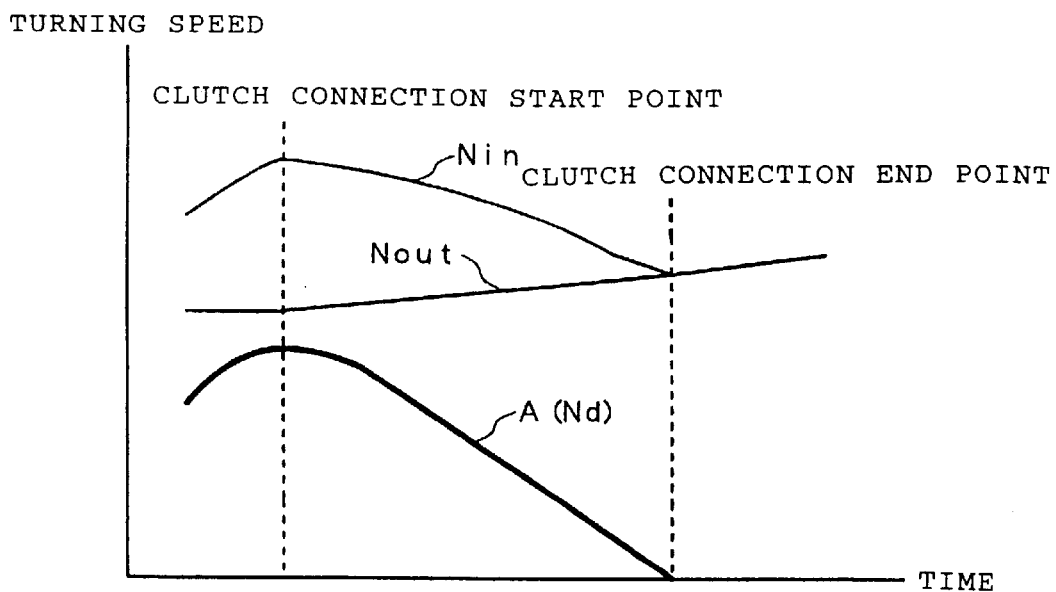
FIG. 21 is a graph showing a turning speed Nin of a clutch drive side, a turning speed Nout of a clutch driven side, and a turning speed difference Nd therebetween upon shift-up along with open-operation of the accelerator.

FIG. 21 is a graph showing a turning speed Nin of a clutch drive side, a turning speed Nout of a clutch driven side, and an absolute value A (Nd) of a turning speed difference Nd between the turning speeds Nin and Nout upon shift-up performed along with open-operation of the accelerator.

Upon shift-up along with open-operation of the accelerator, directly after clutch connection is released, the turning speed Nin of the clutch drive side is increased in response to the open-operation of the accelerator and the present turning speed Nout of the clutch driven side is almost kept as it is due to the inertia of the wheel side.

Then, as shown in FIG. 21, the automatic speed change process proceeds and a semi-clutch state occurs at a clutch connection start point. In this semi-clutch state, the turning speed Nin of the clutch drive side is decreased because the clutch driven side becomes a turning load, and the turning speed Nout of the clutch driven side is increased because the clutch driven side is dragged by the clutch drive side. The turning speed difference A (Nd) between both the turning speeds Nin and Nout disappears at a clutch connection end point. Accordingly, the turning speed difference A (Nd) is also a function with the clutch connection start point taken as an inflection point (peak value).

Figure 22:
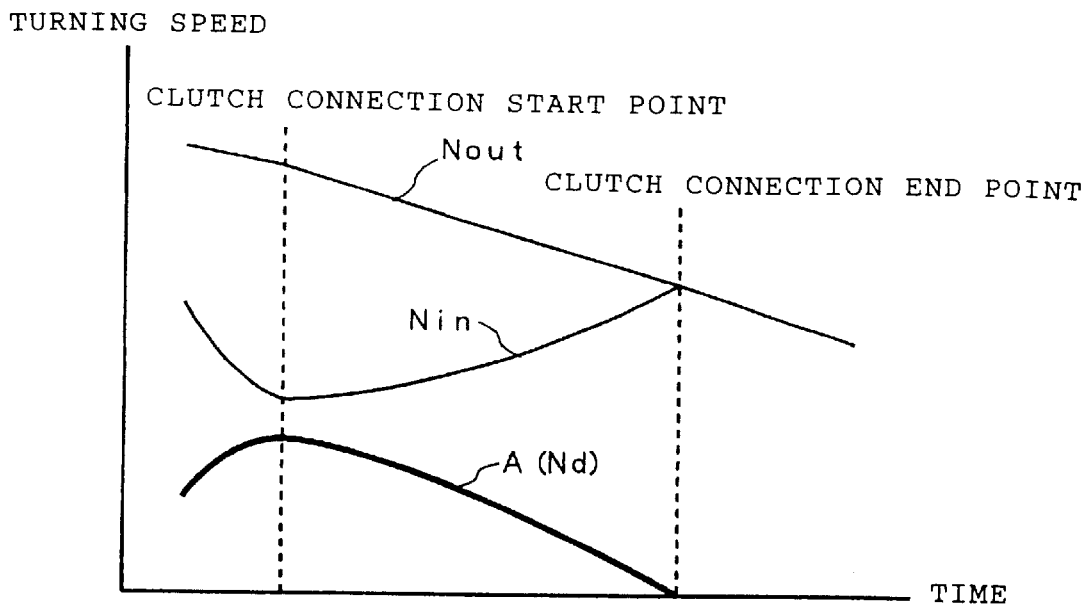
FIG. 22 is a graph showing a turning speed Nin of a clutch drive side, a turning speed Nout of a clutch driven side, and a turning speed difference Nd therebetween upon shift-down after return of an accelerator from a medium/high turning range.

FIG. 22 is a graph showing a turning speed Nin of a clutch drive side, a turning speed Nout of a clutch driven side, and an absolute value A (Nd) of a turning speed difference Nd between the turning speeds Nin and Nout upon shift-down performed after return of the accelerator from a medium/high rotational range.

Upon shift-down performed after return of the accelerator from a medium/high rotational range, directly after clutch connection is released, the turning speed Nin of the clutch drive side is decreased and the turning speed Nout of the clutch driven side is also gradually decreased.

Then, as shown in FIG. 22, the automatic speed change process proceeds and a semi-clutch state occurs at a clutch connection start point. In this semi-clutch state, the turning speed Nin of the clutch drive side is increased because the clutch drive side is dragged by the clutch driven side, and the turning speed Nout of the clutch driven side is decreased because the clutch drive side becomes a turning load. The turning speed difference A (Nd) between both the turning speeds Nin and Nout disappears at a clutch connection end point. Accordingly, the turning speed difference A (Nd) is also a function with the clutch connection start point taken as an inflection point (peak value).

Figure 23:
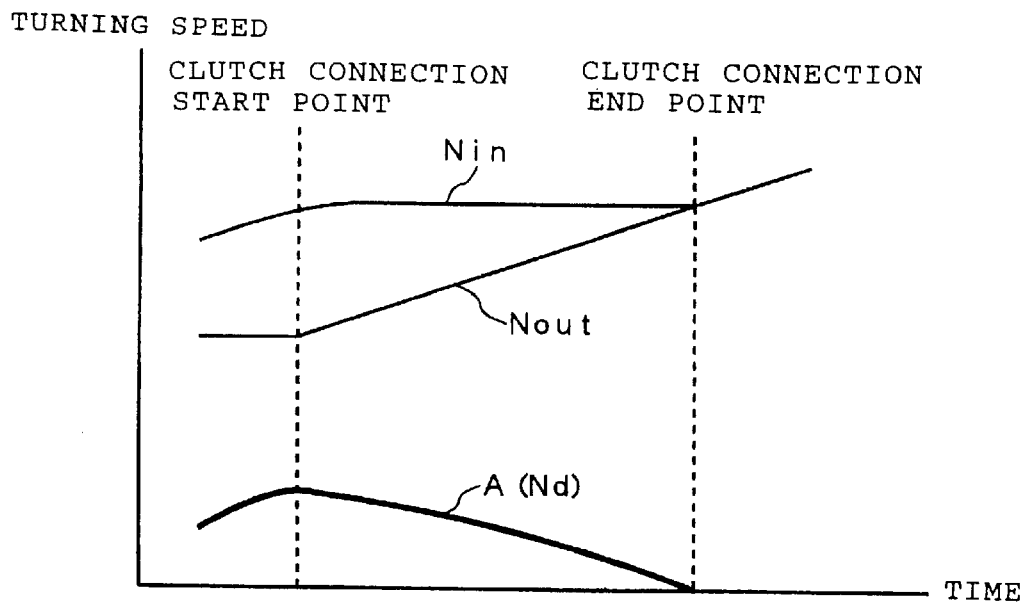
FIG. 23 is a graph showing a turning speed Nin of a clutch drive side, a turning speed Nout of a clutch driven side, and a turning speed difference Nd therebetween upon shift-down along with open-operation of the accelerator.

FIG. 23 is a graph showing a turning speed Nin of a clutch drive side, a turning speed Nout of a clutch driven side, and an absolute value A (Nd) of a turning speed difference Nd between the turning speeds Nin and Nout upon shift-down performed along with open-operation of the accelerator.

Upon shift-down along with open-operation of the accelerator, directly after clutch connection is released, the turning speed Nin of the clutch drive side is increased in response to the open-operation of the accelerator and the present turning speed Nout of the clutch driven side is almost kept as it is due to the inertia of the wheel side.

Then, as shown in FIG. 23, the automatic speed change process proceeds and a semi-clutch state occurs at a clutch connection start point. In this semi-clutch state, the increase in turning speed Nin of the clutch drive side is blocked by the clutch driven side functioning as a turning load, and the turning speed Nout of the clutch driven side is increased because the clutch driven side is dragged by the clutch drive side. The turning speed difference A (Nd) between both the turning speeds Nin and Nout disappears at a clutch connection end point. Accordingly, the turning speed difference A (Nd) is also a function with the clutch connection start point taken as an inflection point (peak value).

In this way, the feature of this embodiment is based on the fact that a timing at which a time-dependent rate of change $\Delta Nd$ of the turning speed difference A (Nd) between the turning speeds of the clutch drive side and the clutch driven side represents the clutch connection start point, that is, the semi-clutch state start point irrespective of the speed change mode, and this embodiment is characterized in that the gear shift speed is variably controlled on the basis of the clutch connection start point determined by the time-dependent rate of change $\Delta Nd$.

The basis concept of the quick-return control will be described below with reference to FIGS. 24 and 25.

As described above, according to this embodiment, the clutch connection speed is controlled in multi-stages; however, it is sometimes required to immediately perform clutch connection depending on the running state of the vehicle and the kind of accelerating operation.

Figure 24:
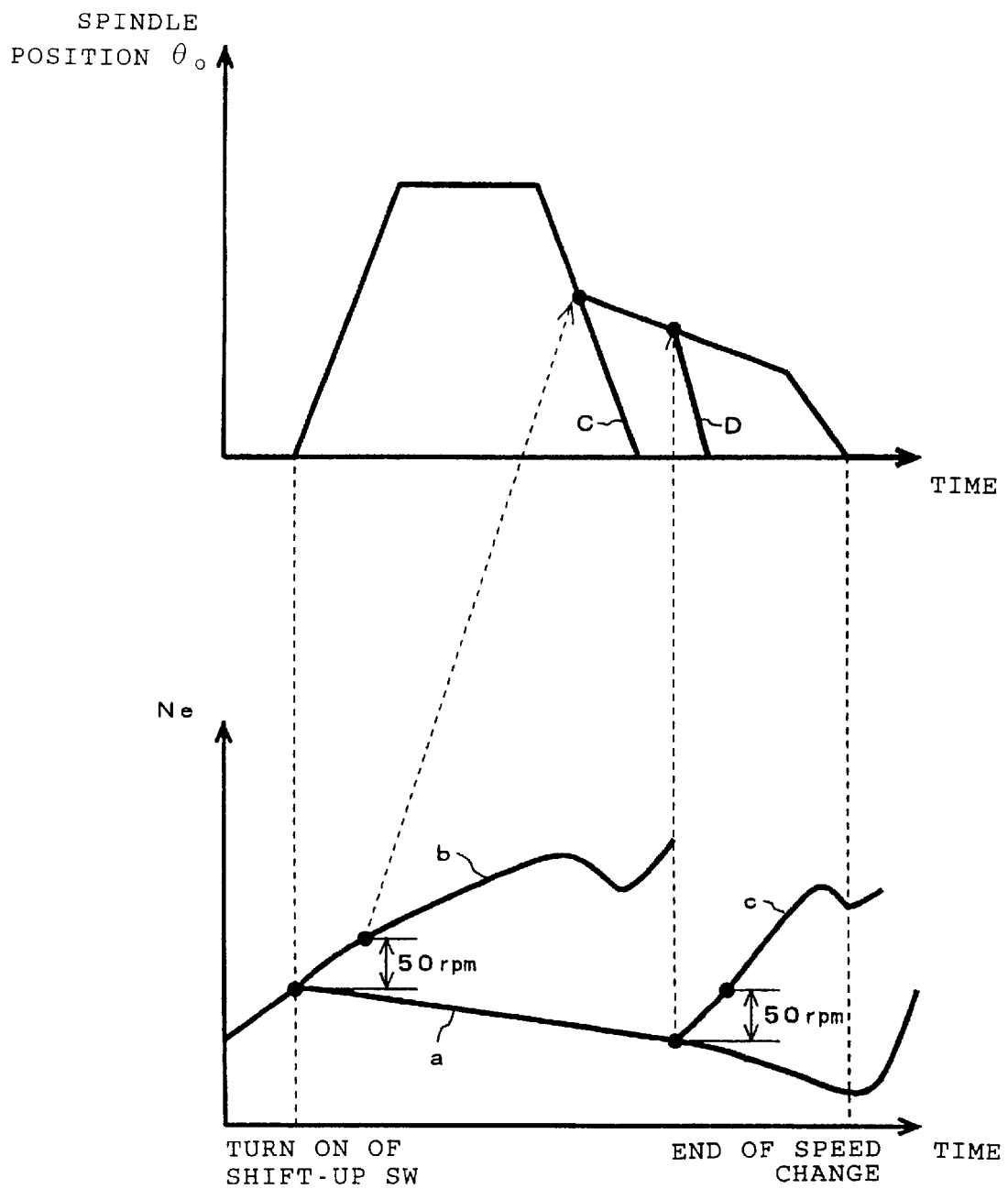
FIG. 24 is an operational timing chart showing changes in position of the shift spindle and engine speed by quick-return control according to the present invention carried out upon shift-up.
Figure 25:
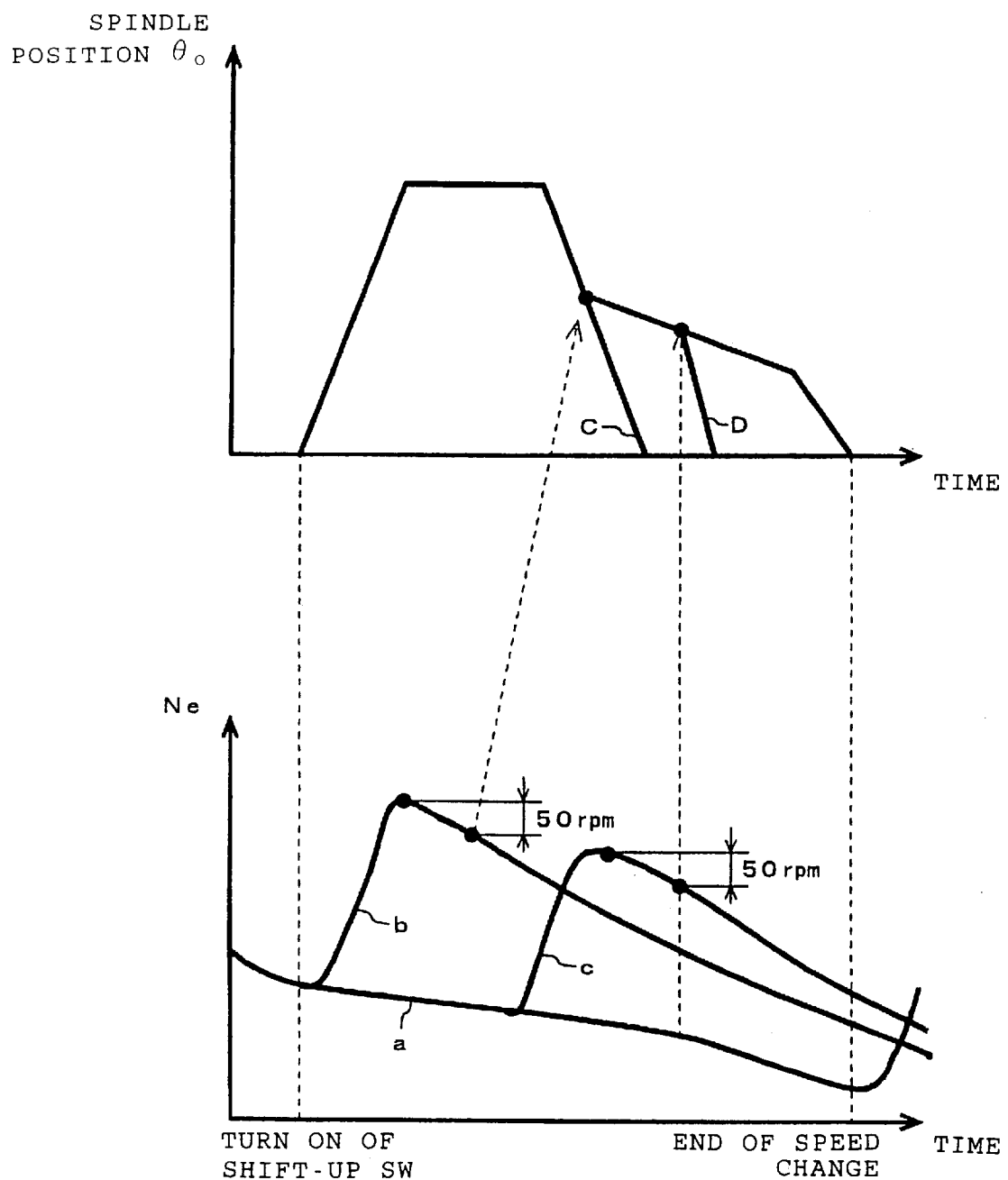
FIG. 25 is an operational timing chart showing changes in position of the shift spindle and engine speed by quick-return control according to the present invention carried out upon shift-down.

FIGS. 24 and 25 are operational timing charts showing changes in the shift spindle position $\theta_O$ and engine speed Ne depending on the quick-return control carried out upon shift-up and shift-down, respectively.

As shown in FIG. 24, the shift-up operation is generally performed by turning on the shift-up switch 51 after return of the accelerator, carrying out the speed change operation, and opening the accelerator after re-connection of the clutch. During this shift-up operation, the engine speed Ne is changed as shown by a solid line "a".

However, the driver may operate the shift-up switch 51 without return of the accelerator or may open the accelerator before re-connection of the clutch. In such a case, to meet the driver's requirement for quick shift change, it may be desirable to quickly perform clutch connection.

According to this embodiment, if the engine speed Ne is changed as shown by a solid-line "b", it is decided that the shift-up switch 51 is turned on without return of the accelerator by the driver, and the quick-return control for immediate clutch connection is carried out as shown by a solid line C, and if the engine speed Ne is changed as shown by a solid line "c", it is decided that the accelerator is opened earlier than a clutch connection timing, and the quick-return control for immediate clutch connection is carried out as shown by a solid line D.

As shown in FIG. 25, the shift-down operation is generally performed by turning on the shift-down switch 52 after return of the accelerator, carrying out the speed change operation, and opening the accelerator after re-connection of the clutch. During this shift-up operation, the engine speed Ne is changed as shown by a solid line "a".

Upon shift-down, however, the engine may be idled by the driver. In such a case, to ensure good riding comfort, it may be desirable to quickly perform clutch connection.

According to this embodiment, if the engine speed Ne is changed as shown by a solid line "b" or "c", it is decided that the engine is idled by the driver, and the quick-return control is performed as shown by a solid-line C or D.

The operations for the above-described quick-return control and clutch connection control will be described in detail below.

Figure 26:
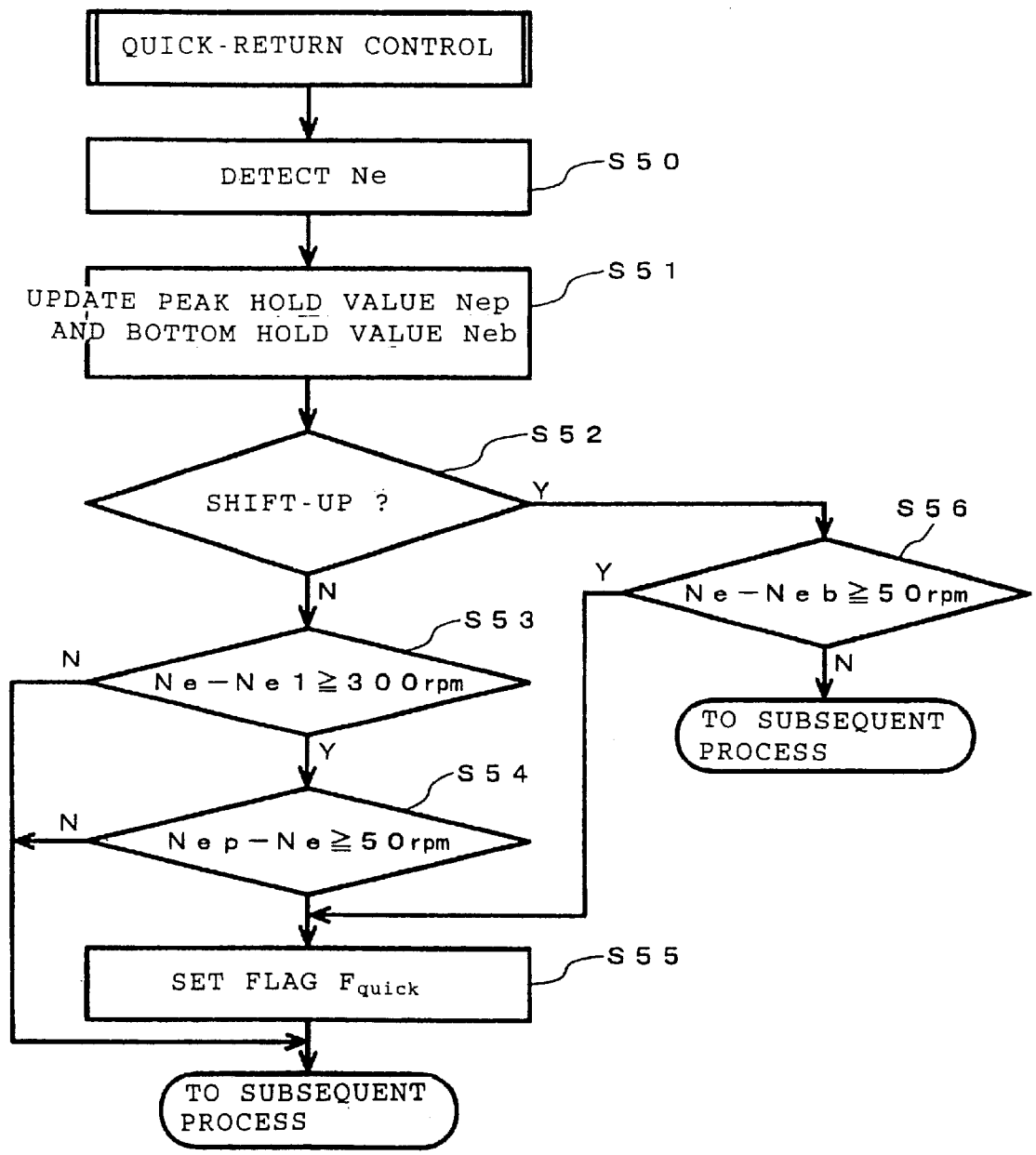
FIG. 26 is a flowchart of quick-return control.

FIG. 26 is a flowchart showing the quick-return control carried out at the above-described steps S21, S26, S31, and S43.

The present engine speed Ne is measured at step S50, and a peak hold value Nep and a bottom hold value Neb of the engine speeds Ne having been measured until now are updated on the basis of the present engine speed Ne at step S51. It is decided at step S52 which is continued, the shift-up state or the shift-down state. If the shift-up state is continued, the process goes on to step S56, and if the shift-down state is continued, the process goes on to step S53.

At step S56, it is decided whether or not a difference (Ne−Neb) between the present engine speed Ne detected at step S50 and the bottom hold value Neb updated at step S51 is 50 rpm or more.

This decision is a decision whether or not the accelerator is closed upon shift-up. If the difference is 50 rpm or more, it is decided that the shift-up switch 51 is turned on without return of the accelerator by the driver or the accelerator is opened earlier than the clutch connection timing. In this case, the process goes on to step S55 at which a quick-return flag $F_{quick}$ is set for immediate clutch connection, to thus end this process. If the difference is less than 50 rpm, the engine speed control is ended without setting the quick-return flag $F_{quick}$ for continuing the usual control.

If it is decided at step S52 that the shift-down state is continued, the process goes on to step S53 at which it is decided whether or not a difference (Ne−Ne1) between the present engine speed Ne and the engine speed Ne1 stored at the above-described step S12 is 300 rpm or more. If the difference is 300 rpm or more, it is decided at step S54 whether or not a difference (Nep-Ne) between the peak hold value Nep updated at step S51 and the present engine speed Ne is 50 rpm or more.

This decision is a decision whether or not the engine is idled by the driver upon shift-down. If YES at both steps S53 and S54, it is decided that the engine is idled by the driver upon shift-down, and the process goes on to step S55 at which the quick-return flag $F_{quick}$ is set, to thus end this process.

Figure 27:
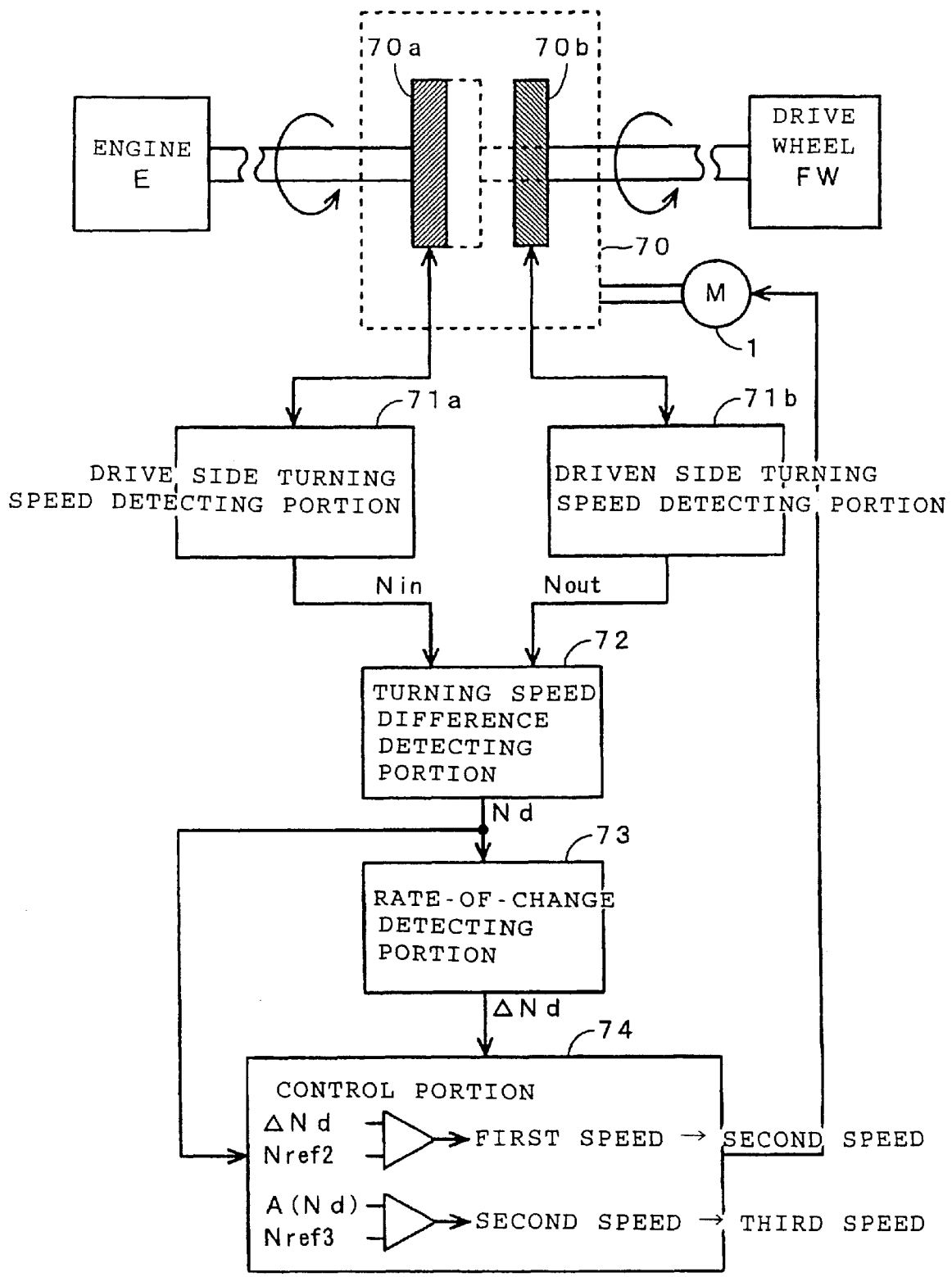
FIG. 27 is a block diagram of a clutch connection control unit according to an embodiment of the present invention.
Figure 28:
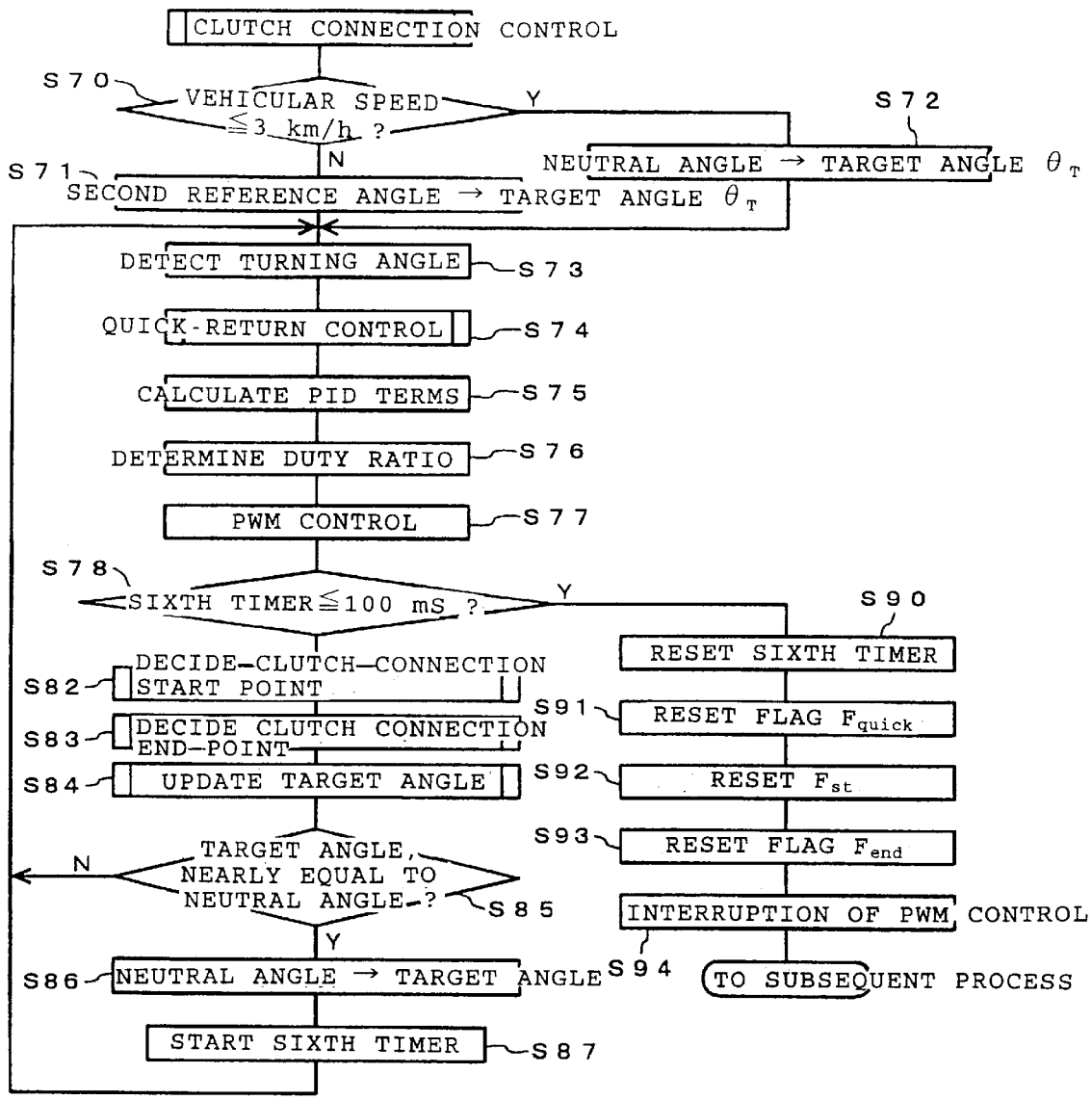
FIG. 28 is a flowchart of clutch connection control.

FIG. 27 is a block diagram of a clutch connection control unit for carrying out the clutch connection control at the above-described step S28 (see FIG. 17) and step S36 (see FIG. 18), and FIG. 28 is a flowchart of operations for clutch connection control.

Referring to FIG. 27, a clutch drive side (clutch disk) 70a is connected to an engine E, and a clutch driven side (clutch plate) 70b is connected to a drive wheel FW via a transmission. A separation distance of the driven side 70b from the drive side 70a, that is, the disconnection/connection of the clutch is controlled by a clutch release mechanism 70 driven by a drive motor 1.

A drive side turning speed detecting portion 71a detects a turning speed Nin of the drive side 70a. A driven side turning speed detecting portion 71b detects a turning speed Nout of the driven side 70b. A turning speed difference detecting portion 72 detects a difference Nd between the detected drive side turning speed Nin and driven side turning speed Nout. A rate-of-change detecting portion 73 detects a time-dependent rate of change ΔNd of an absolute value A (Nd) of the detected turning speed difference Nd.

A control portion 74 controls the drive motor 1 in such a manner that the clutch release mechanism 70 performs clutch connection at a first speed until the detected rate of change ΔNd becomes a specific value or less; performs clutch connection at a second speed lower than the first speed after the rate of change ΔNd becomes the specific value or less; and performs clutch connection at a third speed higher than the second speed after the difference Nd becomes another specific value or less.

Figure 30:
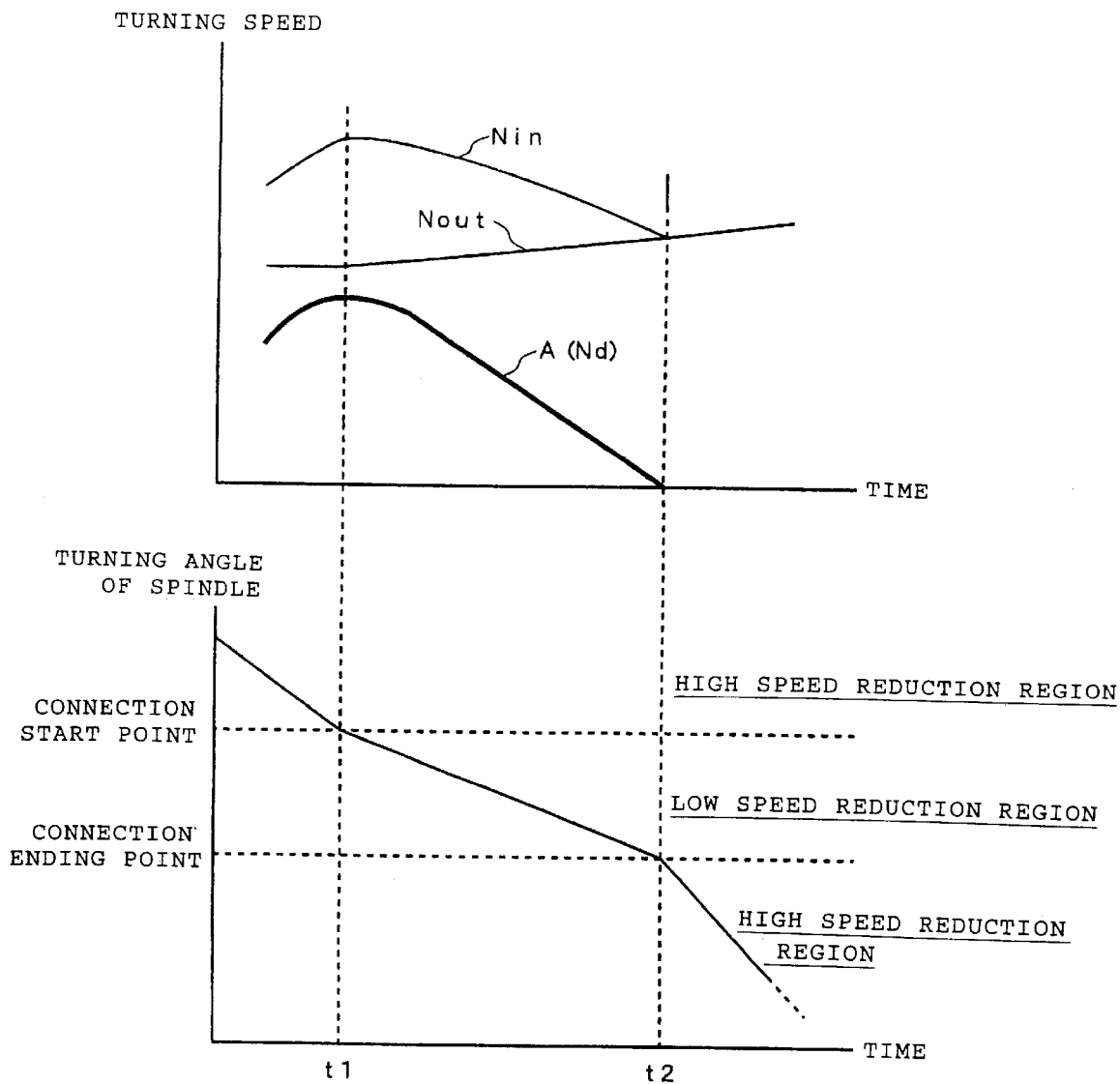
FIG. 30 is a graph showing operational states of respective portions shown in FIG. 27.

FIG. 30 is a graph showing operations of respective portions of the clutch connection control unit shown in FIG. 27, wherein the upper portion of FIG. 30 shows a change in turning speed of the clutch with an elapsed time, and the lower portion of FIG. 30 shows a change in turning speed of the spindle. The gear shift operations will be described by way of the example, in which shift-up is performed along with open-operation of the accelerator, described with reference to FIG. 21.

At step S70 shown in FIG. 28, it is decided whether or not the vehicular speed is approximately zero. In this embodiment, if the vehicular speed is 3 km/h or less, it is decided that the vehicular speed becomes approximately zero, and the process goes on to step S72 at which a neutral position of the shift spindle 3 is set at a target angle $\theta_T$, and thereafter the process goes on to step S73. The reason why the neutral position is set at the target angle $\theta_T$ at step S72 before the process goes on to step S73 is that since the gear shift in the state in which the vehicle is substantially stopped does not exert any effect on riding comfort, such a gear shift is required to be quickly performed.

If it is decided at step S70 that the vehicular speed is 3 km/h or more, the process goes on to step S71 at which a second reference angle (±12°) returned by 6° from an angle (±18° in this embodiment) at which the turning of the shift spindle 3 is restricted by the stopper is set at the target angle $\theta_T$, and thereafter the process goes on to step S73. At step S73, a present turning angle $\theta_O$ of the shift spindle 3 is detected by the angle sensor 28. Then, quick-return control is carried out at step S74.

A PID (Proportional plus Integral plus Derivative) additional value for PID control is calculated at step S75. That is to say, a proportional (P) term represented by a difference $(\theta_O-\theta_T)$ between the present turning angle $\theta_O$ detected at step S73 and the target angle $\theta_T$, an integral (I) term which is an integral value of the P term, and a derivative (D) term which is a derivative value of the P term are added to each other. A duty ratio for PWM control is determined on the basis of the PID additional value thus obtained at step S76, and the PWM control is carried out at step S77.

Figure 31:
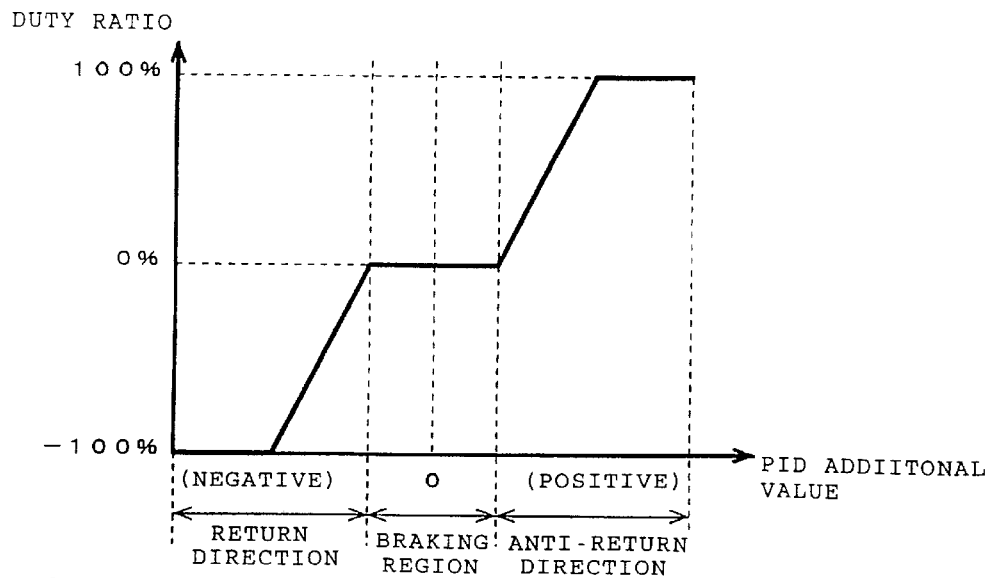
FIG. 31 is a graph showing a relationship between a PID additional value and a duty ratio.

FIG. 31 is a graph showing a relationship between a PID additional value and a duty ratio. If a PID additional value is positive, a positive duty ratio is correspondingly selected, and if a PID additional value is negative, a negative duty ratio is correspondingly selected. Here, the positive (+)/negative (−) duty ratio designates a combination of the FETs subjected to PWM control. For example, +50% duty ratio means that the FETs 2̂ and 4̂ are subjected to PWM control at a 50% duty ratio, and −50% duty ratio means that the FETs 1̂ and 3̂ are subjected to PWM control at a 50% duty ratio.

It is decided at step S78 whether or not the period of time counted by a sixth timer exceeds 100 ms. Since the sixth timer does not starts time-counting at the initial stage, the process goes on to step S82. The process for "decision of clutch connection start point", the process for "decision of clutch connection end point", and the process for "update of target angle" are carried out at steps S82, S83, and S84, respectively.

Figure 29:
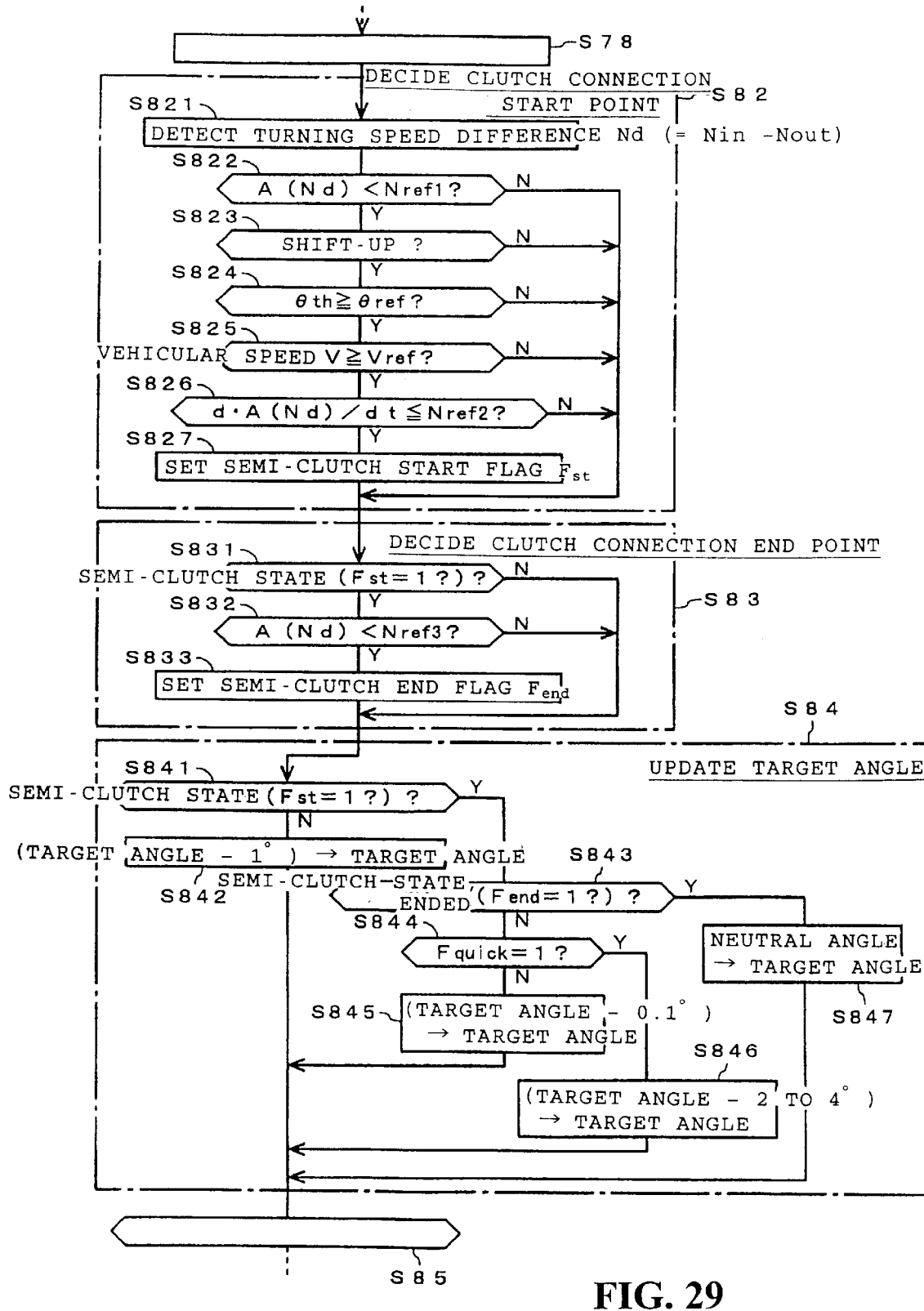
FIG. 29 is a flowchart showing main operations of clutch connection control in detail.

FIG. 29 is a flowchart showing operations of respective portions in the abovedescribed three processes in detail. The process for "decision of clutch connection start point" is carried out at step S82 as follows. At step S821, the difference Nd between the turning speed Nin of the clutch drive side 70a detected by the drive side turning speed detecting portion 71a and the turning speed Nout of the clutch driven side 70b detected by the driven side turning speed detecting portion 71b is detected by the turning speed difference detecting portion 72.

The absolute value A (Nd) of the detected turning speed difference Nd is compared with a reference value Nref1 at step S822. If the turning speed difference A (Nd) is lower than the reference value Nref1, it is decided at step S823 whether or not the present gear shift is shift-up. If YES, a throttle opening degree θth is compared with a reference opening degree θref at step S824. If the throttle opening degree θth is more than the reference opening degree θref, the present vehicular speed V is compared with a reference vehicular speed Vref at step S825.

The vehicular speed V is detected in order that it is decided whether or not a centrifugal starting clutch is in the connection state, and the reference value Vref is a variable with the present gear trains taken as a function. Here, if the vehicular speed V is more than the reference vehicular speed Vref and thereby it is decided that the starting clutch is in the connection state, the process goes on to step S826 for decision of the connection start point of the speed change clutch.

At step S826, the time-dependent rate of change ΔNd of the detected turning speed difference A (Nd) is detected by the rate-of-change detecting portion 73. The control portion 74 further compares the detected time-dependent rate of change ΔNd with a specific reference value Nref2. The reference value Nref2 is previously set at a value estimated as an inflection point. The time-dependent rate of change ΔNd is more than the reference value Nref2 directly after speed change operation, as described with reference to FIGS. 20 to 24, and accordingly, the process goes on to step S83 for carrying out the "decision of clutch connection end point".

The process for decision of the clutch connection end point is carried out at step S83 as follows. First, at step S831, it is decided on the basis of a semi-clutch start flag $F_{st}$ whether or not a semi-clutch state starts. Since it is decided here that the semi-clutch state does not start, the process for decision of the clutch connection end point is not substantially carried out, the process goes on to step S84 for carrying out the "update of target angle".

In this way, according to this embodiment, the clutch connection state is decided not on the basis of the turning speed difference Nd but on the basis of the absolute value A (Nd) of the turning speed difference Nd, even if the turning speed of the drive side 70a or driven side 70b largely varies due to some external causes and thereby the turning speed difference Nd becomes lower than the reference value, it is not decided that the turning speed difference between the turning speeds of the drive side 70a and driven side 70b disappears, unless the absolute value A (Nd) becomes lower than the reference value.

According to this embodiment, since the decision based on the time-dependent rate of change of the turning speed difference A (Nd) is performed only in the case where the gear shift operation is the shift-up operation and also the throttle opening degree is the specific value or more, even if the turning speed of the drive side 10a is reduced when the throttle valve is closed with the vehicular speed kept at a specific value due to inertia and thereby the requirement of step S826 is occasionally satisfied, it is not erroneously decided that the semi-clutch state starts at the clutch connection point.

According to this embodiment, since the process does not go on to step S826 insofar as the vehicular speed does not exceed the reference value determined on the basis of the gear trains, it is possible to certainly prohibit an erroneous decision that the semi-clutch state starts in the stoppage state of the vehicle in which the centrifugal starting clutch is not connected.

Referring again to FIG. 29, at step S841 contained in step S84 for carrying out the "update of target angle", it is decided on the basis of the semi-clutch start flag $F_{st}$ whether or not the semi-clutch state starts. Since the semi-clutch start flag $F_{st}$ is not set here and thereby the semi-clutch state does not start, the process goes on to step S842 at which an angle obtained by subtracting 1° from the present target angle is set as a new target angle. It is decided at step S85 whether or not the target angle is close to the neutral angle. Then, the process from the above-described step S73 to step S85 is repeated until the target angle comes sufficiently close to the neutral angle.

At this time, since the new target angle is set to be smaller than the initial target angle by 1°, the PID value is set at a relatively large value at steps S75 and S76. Accordingly, at step S77, as shown in FIG. 30, the spindle is turned at a relatively high speed, and the driven side 70b comes close to the drive side 70a at a high speed by the clutch release mechanism 70. When the time-dependent rate of change ΔNd is less than the reference value Nref2 at the time $t_6$ in FIG. 30 and such a time-dependent rate of change ΔNd is detected at step S826 in FIG. 29, the control portion 74 decides that the semi-clutch state starts at the clutch connection start point and sets the semi-clutch start flag $F_{st}$ at step S827.

In the process at step S83 for carrying out the "decision of clutch connection end point", at step S831, it is decided on the basis of the semi-clutch start flag $F_{st}$ whether or not the semi-clutch state starts. Since it is decided here that the semi-clutch state starts, the process goes on to step S832 at which the turning speed difference A (Nd) is compared with a reference value Nref3. The reference value Nref3 is previously set at a value estimated to indicate the end of clutch connection.

Since the turning speed difference A (Nd) is more than the reference value Nref3 at the initial stage, the process goes on to step S84 for carrying out the "update of target angle". In the process at step S84 for carrying out the "update of target angle", it is decided at step S841 that the semi-clutch state starts, and the process goes on to step S843. At step S843, it is decided on the basis of a semi-clutch end flag $F_{end}$ whether or not the semi-clutch state is ended. Since the semi-clutch state is not ended yet here, the process goes on to step S844.

It is decided at step S844 whether or not the quick-return flag $F_{quick}$ is set. If the quick-return flag $F_{quick}$ is not set, the process goes on to step S845 at which an angle obtained by subtracting 0.1° from the present target angle is set as a new target angle. Accordingly, since the PID value is set at a relatively small value at steps S75 and S76 and the spindle is turned at a relatively low speed at step S77 as shown in FIG. 30, the drive side 70b gently comes close to the drive side 70a at a low speed by the clutch release mechanism 70.

If it is decided at step S844 that the quick-return flag $F_{quick}$ is set, at step S846, an angle obtained by subtracting 2° to 4° from the present target opening angle is registered as a new target angle for carrying out the quick-return control. Accordingly, since the PID value is set at a relatively large value in steps S75 and S76 and the spindle is turned at a high speed at step S77, the driven side 70b comes close to the drive side 70a at a high speed by the clutch release mechanism 70.

When the turning speed Nd is less than the reference value Nref3 at the time $t_6$ in FIG. 30 and such a turning speed Nd is detected at step S832 in FIG. 29, the control portion 74 decides that the semi-clutch state is ended at the clutch connection end point and sets the semi-clutch end flag $F_{end}$ at step S833.

In this way, according to this embodiment, the clutch connection end point is detected at step S83 under the condition that the clutch connection start point has been detected at step S82, that is, on the basis of the decision at step S831 that the semi-clutch state starts. Accordingly, even if the turning speed of the drive side 70a or driven side 70b largely varies due to some external causes before the clutch connection end point is detected at step S833 and thereby the requirement of step S833 is satisfied, it is not erroneously decided that the semi-clutch state is ended at the clutch connection end point.

At step S84 for carrying out the "update of target angle", the process goes on to step S847 by way of steps S841 and S843. At step S847, the target angle is set at the neutral angle. Accordingly, since the PID value is set at a relatively high value at steps S75 and S76 and the spindle is turned at a high speed at step S77 as shown in FIG. 30, the drive side 70b comes close to the drive side 70a at a high speed by the clutch release mechanism 70.

As the target angle comes sufficiently close to the neutral angle, the neutral angle is registered as the target angle at step S86 in FIG. 28, and the sixth timer starts time-counting at step S87.

If it is decided at step S78 that the period of time counted by the sixth timer exceeds 100 ms at step S78, the sixth timer is reset at step S90. The quick-return flag $F_{quick}$, the semi-clutch start flag $F_{st}$, and the semi-clutch end flag $F_{end}$ are reset at steps S91, S92, and S93, respectively. The PWM control in the switching circuit 105 is ended at step S94.

If the gear is shifted from the neutral state upon high speed running of the vehicle or upon high speed rotation of the engine, an excessively high load is applied to the engine because a relatively high engine brake force is applied. From this viewpoint, according to this embodiment, there is provided a speed change prohibiting system of prohibiting the control shown in FIG. 16 even if the shift-up switch 51 is turned on, in the case where the vehicular speed is 10 km/h or more or the engine speed is 3000 rpm or more.

Figure 11:
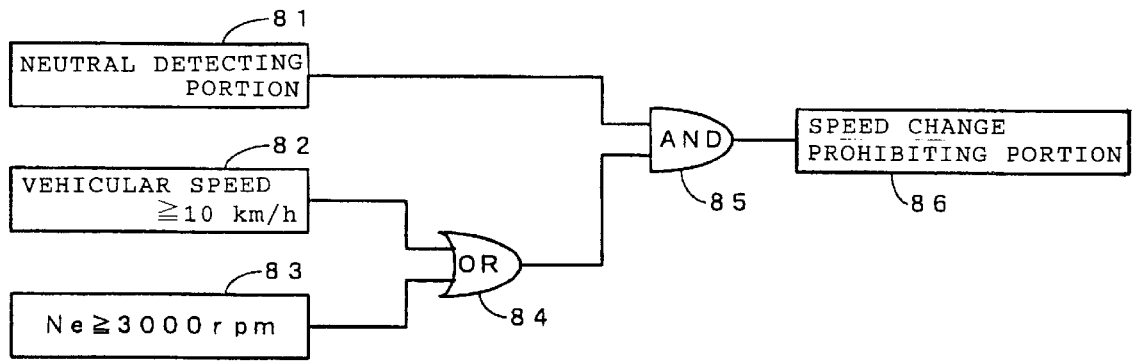
FIG. 11 is a block diagram showing a function of a speed change prohibiting system.

FIG. 11 is a block diagram showing a function of the speed change prohibiting system. A neutral detecting portion 81 outputs a signal of an "H" level when the gear is located at the neutral position. A vehicular speed decision portion 82 outputs a signal of an "H" level when the vehicular speed is 10 km/h or more. An engine speed decision portion 83 outputs a signal of an "H" level when the engine speed is 3000 rpm or more.

An OR circuit 84 outputs a signal of an "H" level when the output of the vehicular speed decision portion 82 or the engine speed decision portion 83 is at the "H" level. An AND circuit 85 outputs a signal of an "H" level when the outputs of the OR circuit 84 and the neutral detecting portion 81 are each at the "H" level. If the output of the AND circuit 85 is at the "H" level, a speed change prohibiting portion 86 prohibits the control shown in FIG. 16 even if the shift-up switch 51 is turned on.

However, if the gear is erroneously shifted to the neutral at the vehicular speed of 10 km/h or more or at the engine speed of 3000 rpm or more during acceleration from the first speed, it takes a lot of time to carry out re-acceleration. Accordingly, in the case of additionally providing the above-described speed change prohibiting system, there may be further provided a system of prohibiting the gear shift to the neutral during running of the vehicle at a vehicular speed of 3 km/h or more.

According to the present invention, since the clutch connection start point is decided on the basis of the time-dependent rate of change of a difference between the turning speeds of the clutch drive side and the clutch driven side, it is possible to accurately detect the clutch connection start point irrespective of differences between respective clutch mechanisms and deterioration of each clutch mechanism with an elapsed time.

Further, according to the present invention, since the clutch drive side and the clutch driven side come close to each other at a high speed until the clutch connection start point detected as described above and come close to each other at a low speed in an operational region for clutch connection after the clutch connection start point, it is possible to shorten the time required for clutch connection, prevent the degradation of riding comfort, and ensure a good operability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch connection control system comprising:
   clutch release means for disconnecting and connecting a clutch drive side from a clutch driven side by turning an electric motor;
   drive side turning speed detecting means for detecting a turning speed of the clutch drive side;
   driven side turning speed detecting means for detecting a turning speed of the clutch driven side;
   turning speed difference detecting means for detecting a difference between said detected turning speed of the clutch drive side and said detected turning speed of the clutch driven side;
   rate-of-change detecting means for detecting a time-dependent rate of change of said detected turning speed difference; and
   control means for controlling said clutch release means to disconnect and connect the clutch drive side from the clutch driven side, on the basis of said detected turning speed difference, and said control means controls clutch connection at a first speed until the time-dependent rate of change of said detected turning speed difference becomes a specific value or less, and said control means controls clutch connection at a second speed lower than said first speed after the time-dependent rate of change of said detected turning speed difference becomes said specific value or less.

2. The clutch connection control system according to claim 1, wherein said control system further comprises comparing means for comparing said turning speed difference with another specific value, and said control means controls clutch connection at said second speed until said turning speed difference becomes said another specific value or less, and said control means controls clutch connection at a third speed higher than said second speed after said turning speed difference becomes said another specific value or less.

3. The clutch connection control system according to claim 2, wherein said control means controls clutch connection at said second speed from a beginning to an end of a semi-clutch state, and said control means controls clutch connection at said first speed and said third speed before said semi-clutch state and after said semi-clutch state, respectively.

4. The clutch connection control system according to claim 1, wherein said control means controls clutch connection at said second speed from a beginning to an end of a semi-clutch state, and said control means controls clutch connection at said first speed before said semi-clutch state.

5. A clutch connection control system comprising:
a clutch release mechanism for disconnecting and connecting a clutch drive side from a clutch driven side;
a drive side turning speed detecting portion for detecting a turning speed of the clutch drive side;
a driven side turning speed detecting portion for detecting a turning speed of the clutch driven side;
a turning speed difference detecting portion for detecting a difference between said detected turning speed of the clutch drive side and said detected turning speed of the clutch driven side;
a rate-of-change detecting portion for detecting a time-dependent rate of change of said detected turning speed difference; and
a control portion for controlling said clutch release mechanism to disconnect and connect the clutch drive side from the clutch driven side, on the basis of said detected turning speed difference, and said control portion controls clutch connection at a first speed until the time-dependent rate of change of said detected turning speed difference becomes a specific value or less, and said control means controls clutch connection at a second speed lower than said first speed after the time-dependent rate of change of said detected turning speed difference becomes said specific value or less.

6. The clutch connection control system according to claim 5, wherein said control system further comprises a comparing portion for comparing said turning speed difference with another specific value, and said control portion controls clutch connection at said second speed until said turning speed difference becomes said another specific value or less, and said control portion controls clutch connection at a third speed higher than said second speed after said turning speed difference becomes said another specific value or less.

7. The clutch connection control system according to claim 6, wherein said control portion controls clutch connection at said second speed from a beginning to an end of a semi-clutch state, and said control portion controls clutch connection at said first speed and said third speed before said semi-clutch state and after said semi-clutch state, respectively.

8. The clutch connection control system according to claim 5, wherein said control portion controls clutch connection at said second speed from a beginning to an end of a semi-clutch state, and said control portion controls clutch connection at said first speed before said semi-clutch state.

9. A method of controlling clutch connection comprising the steps of:
disconnecting and connecting a clutch drive side from a clutch driven side with a clutch release mechanism;
detecting a turning speed of the clutch drive side;
detecting a turning speed of the clutch driven side;
detecting a difference between said detected turning speed of the clutch drive side and said detected turning speed of the clutch driven side;
detecting a time-dependent rate of change of said detected turning speed difference; and
controlling said clutch release mechanism to disconnect and connect the clutch drive side from the clutch driven side, on the basis of said detected turning speed difference, said step of controlling further comprising the steps of controlling clutch connection at a first speed until the time-dependent rate of change of said detected turning speed difference becomes a specific value or less, and controlling clutch connection at a second speed lower than said first speed after the time-dependent rate of change of said detected turning speed difference becomes said specific value or less.

10. The method according to claim 9, further comprising the step of comparing said turning speed difference with another specific value, and said step of controlling further comprises the steps of controlling clutch connection at said second speed until said turning speed difference becomes said another specific value or less, and controlling clutch connection at a third speed higher than said second speed after said turning speed difference becomes said another specific value or less.

11. The method according to claim 10, wherein said controlling step further comprises the steps of controlling clutch connection at said second speed from a beginning to an end of a semi-clutch state, and controlling clutch connection at said first speed and said third speed before said semi-clutch state and after said semi-clutch state, respectively.

12. The method according to claim 9, wherein said controlling step further comprises the steps of controlling clutch connection at said second speed from a beginning to an end of a semi-clutch state, and controlling clutch connection at said first speed before said semi-clutch state.

13. The method according to claim 9, wherein said step of detecting the clutch drive side further comprises the step of detecting a turning speed of the clutch drive side with a drive side turning speed detecting portion, and said step of detecting the clutch driven side further comprises the step of detecting a turning speed of the clutch driven side with a driven side turning speed detecting portion, and said step of detecting the turning speed difference further comprises the step of detecting a turning speed difference with a turning speed difference detecting portion.

* * * * *